(12) United States Patent
Adams et al.

(10) Patent No.: US 6,816,481 B1
(45) Date of Patent: Nov. 9, 2004

(54) INTERNET CALLER IDENTIFICATION SYSTEM AND METHOD

(75) Inventors: Thomas Lee Adams, Austin, TX (US); Laura Kay Culli, Austin, TX (US); Michael Albert Machacek, Bulverde, TX (US); Richard Everett Sabinson, San Antonio, TX (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

(21) Appl. No.: 09/545,459

(22) Filed: Apr. 7, 2000

Related U.S. Application Data

(60) Provisional application No. 60/128,474, filed on Apr. 9, 1999.

(51) Int. Cl.[7] .......................... H04L 12/56; H04L 12/64
(52) U.S. Cl. ....................... 370/352; 370/353; 370/356
(58) Field of Search ........................ 370/259, 352–356, 370/400, 401, 410, 522; 379/88.11–88.13, 88.19–88.21, 201.01, 201.12, 211.01, 215.01, 221.08, 221.09, 221.1, 221.11, 221.12

(56) References Cited

U.S. PATENT DOCUMENTS

| | | |
|---|---|---|
| 3,934,079 A | 1/1976 | Barnhart |
| 4,191,860 A | 3/1980 | Weber |

(List continued on next page.)

FOREIGN PATENT DOCUMENTS

| | | |
|---|---|---|
| BR | 8603764 | 5/1988 |
| EP | 0380315 | 8/1990 |
| EP | 0740480 | 10/1996 |
| FR | 2305078 | 10/1976 |
| FR | 2320670 | 3/1977 |
| GB | 2193419 | 2/1988 |
| GB | 2223911 | 4/1990 |
| JP | 1-78059 | 3/1989 |
| JP | 64-78059 | 3/1989 |
| JP | 1-91560 | 4/1989 |
| JP | 2-113657 | 4/1990 |
| JP | 2-202278 | 8/1990 |
| JP | 2-299361 | 12/1990 |
| JP | 3-29456 | 2/1991 |
| WO | 98/52342 | 11/1998 |

OTHER PUBLICATIONS

English Language Abstract of JP 3–29456.
English Language Abstract of JP 64–78059.
English Language Abstract of JP 2–202278.
English Language Abstract of JP 2–113657.
English Language Abstract of FR 2 305 078.
English Language Abstract of FR 2 320 670.
English Language Abstract of JP 1–78059.
English Language Abstract of JP 1–91560.
English Language Abstract of JP 2–299361.

(List continued on next page.)

*Primary Examiner*—Huy D. Vu
*Assistant Examiner*—Daniel Ryman
(74) *Attorney, Agent, or Firm*—Greenblum & Bernstein, P.L.C.

(57) ABSTRACT

The present invention is an Advanced Intelligent Network (AIN) based system and method that allows a subscriber connected to the Internet via a dial-up connection to receive caller identification information concerning an incoming telephone call. The information may be provided via a pop-up dialog box on the subscriber's display, which includes but is not limited to a monitor of a personal computer (PC). The information displayed to the subscriber includes the name and number of the calling party, if available. In addition, several disposition options are presented to the subscriber solely via the Internet which, upon selection, determine the handling of the incoming call.

22 Claims, 10 Drawing Sheets

U.S. PATENT DOCUMENTS

| | | |
|---|---|---|
| 4,313,035 A | 1/1982 | Jordan et al. |
| 4,338,492 A | 7/1982 | Snopko |
| 4,349,701 A | 9/1982 | Snopko |
| 4,356,509 A | 10/1982 | Skerlos et al. |
| 4,405,946 A | 9/1983 | Kinight et al. |
| 4,456,925 A | 6/1984 | Skerlos et al. |
| 4,582,956 A | 4/1986 | Doughty |
| 4,611,094 A | 9/1986 | Asmuth et al. |
| 4,611,096 A | 9/1986 | Asmuth et al. |
| 4,756,020 A | 7/1988 | Fodale |
| 4,757,267 A | 7/1988 | Riskin |
| 4,788,718 A | 11/1988 | McNabb et al. |
| 4,802,199 A | 1/1989 | Lange et al. |
| 4,805,205 A | 2/1989 | Faye |
| 4,805,210 A | 2/1989 | Griffith, Jr. |
| 4,852,151 A | 7/1989 | Dittakavi et al. |
| 4,873,719 A | 10/1989 | Reese |
| 4,899,373 A | 2/1990 | Lee et al. |
| 4,922,523 A | 5/1990 | Hashimoto |
| 4,924,496 A | 5/1990 | Figa et al. |
| 4,974,085 A | 11/1990 | Campbell et al. |
| 4,989,081 A | 1/1991 | Miyagawa et al. |
| 4,995,074 A | 2/1991 | Goldman et al. |
| 5,029,199 A | 7/1991 | Jones et al. |
| 5,046,079 A | 9/1991 | Hashimoto |
| 5,046,093 A | 9/1991 | Wachob |
| 5,054,055 A | 10/1991 | Hanle et al. |
| 5,061,992 A | 10/1991 | Ueno |
| 5,073,927 A | 12/1991 | Grube |
| 5,083,205 A | 1/1992 | Arai |
| 5,099,331 A | 3/1992 | Truong |
| 5,109,279 A | 4/1992 | Ando |
| 5,117,452 A | 5/1992 | Callele et al. |
| 5,138,649 A | 8/1992 | Krisbergh et al. |
| 5,148,275 A | 9/1992 | Blatter et al. |
| 5,247,571 A | 9/1993 | Kay et al. |
| 5,315,641 A | 5/1994 | Montgomery et al. |
| 5,343,516 A | 8/1994 | Callele et al. |
| 5,353,331 A | 10/1994 | Emery et al. |
| 5,467,388 A | 11/1995 | Redd, Jr. et al. |
| 5,469,500 A | 11/1995 | Satter et al. |
| 5,491,744 A | 2/1996 | Kikinis |
| 5,513,251 A | 4/1996 | Rochkind et al. |
| 5,519,767 A | 5/1996 | O'Horo et al. |
| 5,524,146 A | 6/1996 | Morrisey et al. |
| 5,533,102 A | 7/1996 | Robinson et al. |
| 5,546,447 A | 8/1996 | Skarbo et al. |
| 5,559,855 A | 9/1996 | Dowens et al. |
| 5,559,856 A | 9/1996 | Dowens et al. |
| 5,559,857 A | 9/1996 | Dowens et al. |
| 5,574,776 A | 11/1996 | Leuca et al. |
| 5,581,604 A | 12/1996 | Robinson et al. |
| 5,625,676 A | 4/1997 | Greco et al. |
| 5,651,060 A | 7/1997 | Cohn et al. |
| 5,680,443 A | 10/1997 | Kasday et al. |
| 5,684,862 A | 11/1997 | Finnigan |
| 5,696,815 A | 12/1997 | Smyk |
| 5,724,412 A | 3/1998 | Srinivasan |
| 5,764,748 A | 6/1998 | Rosenthal et al. |
| 5,805,587 A | 9/1998 | Norris et al. |
| 5,805,677 A | 9/1998 | Ferry et al. |
| 5,805,682 A | 9/1998 | Voit et al. |
| 5,809,112 A | 9/1998 | Ryan |
| 5,809,128 A | 9/1998 | McMullin |
| 5,825,862 A | 10/1998 | Voit et al. |
| 5,835,583 A | 11/1998 | Hetz et al. |
| 5,867,562 A | 2/1999 | Scherer |
| 5,883,943 A | 3/1999 | Siddiqui |
| 5,917,817 A | 6/1999 | Dunn et al. |
| 5,917,888 A | 6/1999 | Giuntoli |
| 5,933,490 A | 8/1999 | White et al. |
| 5,937,050 A | 8/1999 | Yue et al. |
| 5,946,381 A | 8/1999 | Danne et al. |
| 5,982,774 A * | 11/1999 | Foladare et al. ............ 370/401 |
| 5,999,611 A | 12/1999 | Tatchell et al. |
| 6,014,379 A | 1/2000 | White et al. |
| 6,028,917 A | 2/2000 | Creamer et al. |
| 6,031,896 A | 2/2000 | Gardell et al. |
| 6,052,444 A | 4/2000 | Ferry et al. |
| 6,078,581 A * | 6/2000 | Shtivelman et al. ........ 370/352 |
| 6,078,583 A | 6/2000 | Takahara et al. |
| 6,081,589 A | 6/2000 | Jiang et al. |
| 6,097,795 A | 8/2000 | Ungruh et al. |
| 6,101,246 A | 8/2000 | Heinmiller et al. |
| 6,104,800 A | 8/2000 | Benson |
| 6,125,126 A | 9/2000 | Hallenstal |
| 6,144,644 A * | 11/2000 | Bajzath et al. .............. 370/259 |
| 6,178,232 B1 | 1/2001 | Latter et al. |
| 6,205,213 B1 | 3/2001 | Kucmerowski et al. |
| 6,212,261 B1 * | 4/2001 | Meubus et al. .......... 379/88.12 |
| 6,219,413 B1 | 4/2001 | Burg |
| 6,219,414 B1 | 4/2001 | Maciejewski et al. |
| 6,259,692 B1 | 7/2001 | Shtivelman et al. |
| 6,278,771 B1 | 8/2001 | Crockett et al. |
| 6,317,488 B1 | 11/2001 | DePond et al. |
| 6,366,661 B1 | 4/2002 | Devillier et al. |
| 6,418,214 B1 * | 7/2002 | Smythe et al. ......... 379/202.01 |
| 6,434,226 B1 | 8/2002 | Takahashi |
| 2003/0002650 A1 | 1/2003 | Gruchala et al. |

OTHER PUBLICATIONS

Bellcore Technical Reference TR–NWT–000283, Issue 2, "Simplified Message Desk Interface (SMDI) Generic Requirements," (May 1991).

Consumer Information Appliance; p. 8, Published by Jupiter Communications; Oct. 1991.

D. Wachob. "Consumer–Friendly Cable/Telco Intergration: Today and Tomorrow," Communication Technology, Oct. 1991.

Advertising Brochure for Class Mate 10, 1989.

Specification Descrption for MOS integrated circuit u PD 6141.

J. Quain. "Why a Monitor Isn't a TV", PC Magazine, May 14, 1991, pp. 352–353.

Bellcore Publication TR–TSSY–000 31, "Class (sm) Feature: Calling Number Delivery", Issue 3, Jan. 1990.

Opinion of Dec. 3, 1987, *United States v. Western Electric Company*, (DDC. 1987), Civil Action No. 82–0192.

Modification of Final Judgment, *United States v. Western Electric Company* (DDC. 1992), Civil Action No. 82–0192.

Class Mate Systems Corporation Brochure, Mar. 1, 1990.

McGraw–Hill Electronics Dictionary, p. 356, (5$^{th}$ ed 1994) by John Markus & Neil Sclater.

MHE Class Mate 10 and the Rochelle Communications Publications Caller ID plus line Plus systems (pp. 7 and 8 of a Jupiter Communications Publications; Jan./Feb., 1991).

Bergman, Roger K., and Brewster, John H., "Perspective on the AIN Architecture," IEEE Communications Magazine, Feb. 1992, pp. 27–32.

"CLASS Calling Name Delivery Generic Requirements FSD 01–02–1070," LATA Switching Systems Generic Requirements, Bell Communications Research, Technical Reference TR–NWT–001188, Issue 1 (Dec. 1991).

"Switching System Requirements for Call Control Using the Integrated Services Digital Network User Part (ISDNUP)," Bell Communications Research, Technical Reference TR–TSY–00317, Issue 2 (Jan. 1989).

"CLASS Feature: Selective Call Acceptance," Bell Communications Research, Technical Advisory TA–TSY–001034, Issue 1 (Apr. 1990).

"CLASS Feature: Distinctive Ringing/Call Waiting," Bell Communications Research, Technical Reference TR–TSY–000219, Issue 2 (Aug. 1988).

"CLASS Feature: Calling Number Delivery FSD–01–02–1051," Bell Communications Research, Technical Reference TR–TSY–000031, Issue 3 (Jan. 1990).

"ISDN Call Forwarding," Bell Communications Research, Technical Reference TR–TSY–000853, Issue 1 (Dec. 1988).

"ISDN Call Forwarding, Revision 1," Bell Communications Research, Technical Reference TR–TSY–000853, Revison 1 (Dec. 1993).

"Generic Requirements for ISDN Automatic Recall," Bell Communications Research, Technical Reference TR–NWT–001199, Issue 1 (Feb. 1992).

"CLASS Feature: Automatic Recall FSD 01–02–1260," Bell Communications Research, Technical Reference TR–NWT–000227, Issue 3 (Jun. 1993).

"CLASS Feature: Automatic Callback FSD 01–02–1250," Bell Communications Research, Technical Reference TR–NWT–000215, Issue 3 (Jun. 1993).

Dazil Internet Services, "Caller EyeDee", printed on Dec. 13, 2001.

"Internet Call Manager—It's For You", printed on Dec. 13, 2001.

"Internet Caller ID–Call Waiting Manager (ICWM)", by Computer Peripheral Systems, Inc., printed on Dec. 10, 2001.

Method and System for Presenting Customized Call Alerts in a Sence for Internet Caller Identification.

An English Language abstract of EP 0 740 480.

International Search Report corresponding to patent family member of U.S. Application Ser. No. 07/728,341 to Ferry et al., which was filed on Jul. 11, 1991 and now abandoned.

* cited by examiner

INTERNET CALLER IDENTIFICATION SYSTEM AND METHOD

CROSS-REFERENCE TO RELATED APPLICATION

This application claims the benefit of U.S. Provisional Patent Application No. 60/128,474 filed on Apr. 9, 1999, entitled "Internet Caller Identification System" to ADAMS et al., the disclosure of which is expressly incorporated herein by reference in its entirety.

BACKGROUND OF THE INVENTION

1. Field of the Invention

The present invention relates to the field of telecommunications. More particularly, the present invention relates to a telecommunications system for allowing a subscriber connected to the Internet via a dial-up connection to receive notification and caller identification information concerning an incoming telephone call. Further, the invention provides the subscriber with various disposition options for handling the incoming telephone call.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, acronyms will be defined as follows:

Advanced Intelligent Network (AIN)
Central Office (CO)
Called Party Number (CDN)
Calling Party Number (CPN)
Call Processing Record (CPR)
Data and Reporting System (DRS)
Heartbeat Server (HS)
Integrated Service Control Point (ISCP)
Interactive Voice Response (IVR)
Internet Call Waiting Server (ICWS)
Internet Caller Identification (ICID)
Line Information Database (LIDB)
Local Access and Transport Area (LATA)
Local Exchange Carrier (LEC)
Local Routing Number (LRN)
Numbering Plan Area-Central Office Code (NPA-NXX)
Personal Computer (PC)
Public Switched Telephone Network (PSTN)
Registration Server (RS)
Service Control Point (SCP)
Service Switching Point (SSP)
Signaling System 7 (SS7)
Signaling Transfer Point (STP)
Terminating Attempt Trigger (TAT)
Transaction Capabilities Application Part (TACP)
Transmission Control Protocol/Internet Protocol (TCP/IP)

3. Description of Background Information

In recent years, the number of households having Internet access has grown extraordinarily. In fact, having a home personal computer with Internet access is now commonplace. However, most households have only one telephone line which must be shared between a dial-up connection to an Internet Service Provider (ISP) and voice communications via the telephone. This results in several problems, including missed telephone calls and disconnections from the ISP.

When a telephone line is occupied during an Internet session, telephone calls to that line are met with a busy signal. As a result, important calls are not able to be received by the called party until the line is unoccupied. Moreover, the caller has no way of knowing when the line will be free and must continually attempt the call until the party is reached. Additionally, Internet subscribers have no way of knowing who attempted to call them while they were on the Internet. If expecting a call, an Internet subscriber must wait for the call before connecting to the Internet, or risk missing the call. Further, Internet subscribers must deactivate their Call Waiting feature while they access the Internet, or risk undesirable disconnections when an incoming call is attempting to terminate to their line.

As a result, it would be desirable to be informed of an incoming telephone call while being connected to the Internet. It would also be desirable to know the name and number of the calling party, before deciding whether to abandon the Internet connection. It would further be desirable to have a variety of incoming call disposition options available to an Internet subscriber.

One attempt at solving these problems was presented by MCMULLIN, U.S. Pat. No. 5,809,128. MCMULLIN discloses a method and apparatus for permitting notification, identification, and control of incoming calls to a subscriber when the subscriber is connected to a Data Communications Service (DCS) via a dial-up modem over the Public Switched Telephone Network (PSTN).

However, MCMULLIN does not provide a solution that takes advantage of the ubiquitous AIN environment. In fact, the system disclosed in MCMULLIN ignores the features of the AIN, instead relying upon a call forward busy/no answer number feature.

Specifically, MCMULLIN requires the subscriber to activate a call forward busy/no answer number feature which directs blocked calls or unanswered calls to a called party proxy. In circumstances where a subscriber has activated the call forward busy/no answer number feature and the subscriber is using their telephone link (e.g., engaged in data communications) and a second call is placed to the subscriber's line, the call is automatically routed to the proxy telephone link. This method is slow, requires unnecessary processing, and occupies additional resources.

MCMULLIN also requires a dedicated communications channel between the central office and the DCS. This restriction unduly limits the subscriber's choice of Internet Service Provider (ISP). Given the substantial number of ISPs that exist, it would be impractical to have a dedicated channel to each ISP.

The present invention overcomes the problems associated with the prior art.

BRIEF DESCRIPTION OF THE DRAWINGS

The present invention is further described in the detailed description that follows, by reference to the noted plurality of drawings by way of non-limiting examples of preferred embodiments of the present invention, in which like reference numerals represent similar parts throughout several views of the drawings, and in which.

DETAILED DESCRIPTION OF THE PREFERRED EMBODIMENTS

Figure 1:
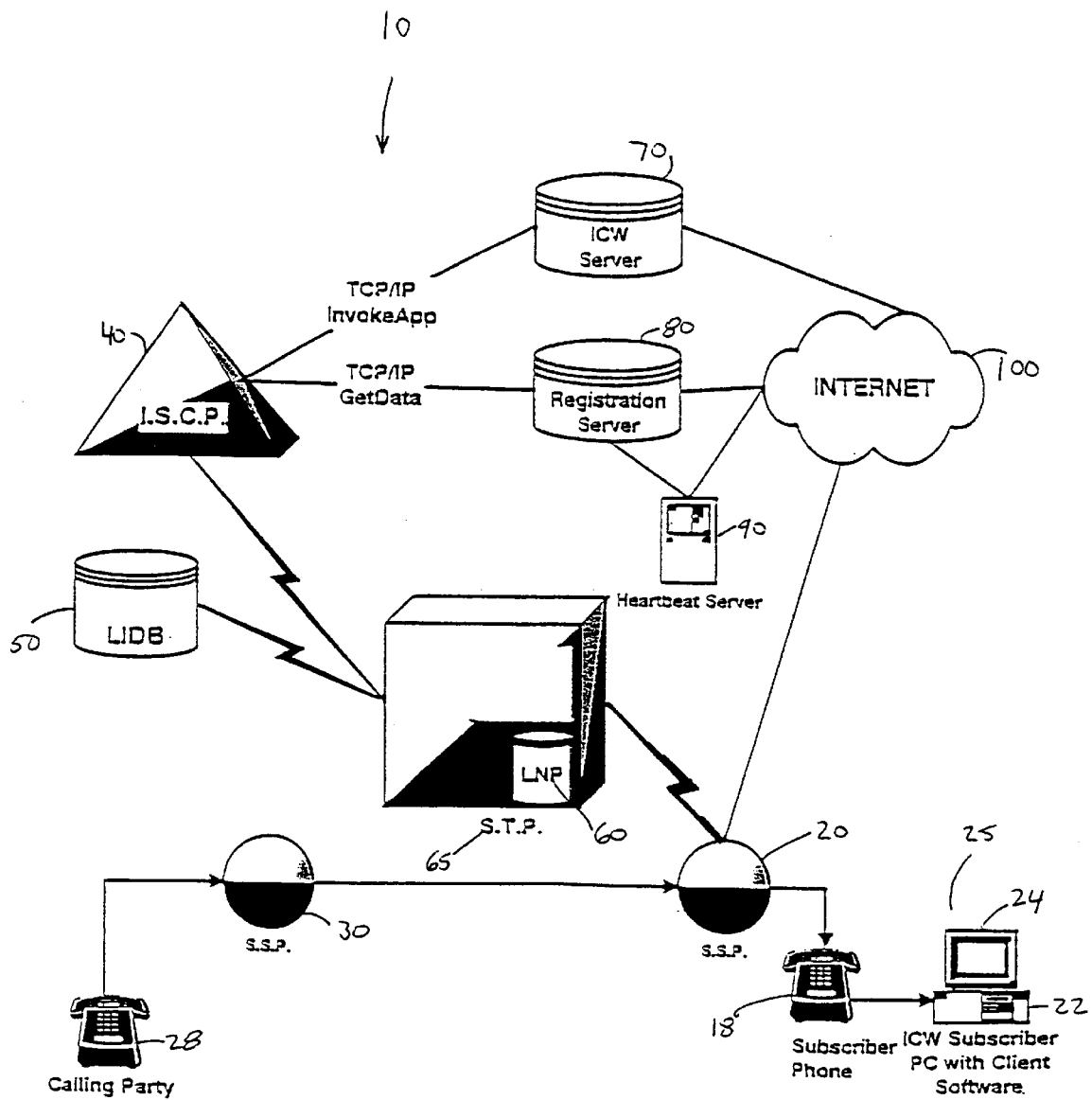
FIG. 1 is a functional block diagram showing an exemplary telecommunications network, according to an aspect of the present invention.

In view of the foregoing, the present invention, through one or more of its various aspects and/or embodiments is thus presented to provide an Internet caller identification system that operates within an AIN environment.

Accordingly, one aspect of the present invention is to provide a method for allowing a subscriber connected to the Internet via a dial-up connection to receive notification and caller identification information associated with an incoming call from a calling party to the subscriber. The method includes receiving the incoming call at a terminating switch, suspending the call at the terminating switch, launching a first query in response to a request from the calling party to establish a connection with the subscriber, and accessing an integrated service control point (ISCP) in response to the first query. The ISCP then launches a second query to a Registration Server (RS) to determine the subscriber's Internet status. The subscriber's Internet status relates to whether the subscriber is connected to the Internet. The method further includes receiving a response at the ISCP from the RS indicating that the subscriber is online, determining identification information associated with the calling party, playing a first announcement to the calling party, sending a message from an Internet Call Waiting Server (ICWS), solely via the Internet, to client software on the subscriber's computer, including notification and caller identification information associated with the incoming call. The subscriber's disposition selection, is received at the ICWS solely via the Internet, a second announcement is played to the calling party, and the call is handled according to the subscriber's disposition selection. The subscriber is able to control disposition of calls while being connected to the Internet.

According to another aspect of the present invention, the handling further includes routing the call from the terminating switch to a destination.

According to another aspect of the present invention, the identification information includes a name and a telephone number of the calling party.

According to yet another aspect of the present invention, if the subscriber's disposition selection is to accept the incoming telephone call, the client software sends a de-registration request to the RS, terminates the Internet dial-up connection, and terminates the incoming call to the subscriber. According to another aspect of the present invention, if the subscriber's disposition selection includes forwarding the call to a voice mail service, the ISCP instructs the switch to terminate the incoming telephone call to the subscriber and the call is then forwarded to the voice mail service. According to another aspect of the present invention, if the subscriber's disposition selection includes forwarding the call to another telephone line, the ISCP instructs the switch to forward the incoming telephone call to the another telephone line. According to another aspect of the present invention, if the subscriber's disposition selection includes playing a message to the caller, the ISCP instructs the switch to play a message to the caller.

According to another aspect of the present invention, the message includes advising the calling party to attempt the call later. According to yet another aspect of the present invention, the message includes advising the calling party that the subscriber will return the call.

According to another aspect of the present invention, the first announcement advises the calling party to hold the telephone line. According to another aspect of the present invention, the second announcement advises the calling party of the subscriber's selected disposition of the telephone call.

Accordingly, another aspect of the present invention is to provide a system for allowing a subscriber connected to the Internet via a dial-up connection to receive notification and caller identification information concerning an incoming call from a calling party. The system includes an Integrated Service Control Point (ISCP) for storing processing instructions for the subscriber and a switch associated with the subscriber that receives the incoming call. The switch has an AIN trigger set to launch a query in response to a request from a calling party to establish a connection with the subscriber and sends the query to the ISCP in response to the trigger, receives routing instructions from the ISCP, and plays announcements in response to instructions from the ISCP. The system further includes a Registration Server (RS) that receives registration requests from client software and stores information related to the subscriber's online status. The RS responds to queries from the ISCP with information about the subscriber's online status. A Heartbeat Server (HS) updates the RS with the subscriber's online status, receives heartbeat messages from the client software via the Internet, and receives de-registration requests from the client software. An Internet Call Waiting Server (ICWS) includes a communications interface between the ISCP and client software, receives information from the ISCP, forwards the information to the subscriber solely via the Internet. The communications interface receives the subscriber's disposition selection solely from the Internet, forwards the disposition selection to the ISCP, and forwards de-registration requests from the client software to the HS.

According to another aspect of the present invention, in response to routing instructions received from the ISCP, the switch routes the call in accordance with the instructions to its destination.

According to another aspect of the present invention, the client software communicates solely via TCP/IP utilizing the Internet with the RS, HS, and ICWS. According to another aspect of the present invention, the HS communicates with the RS solely via TCP/IP utilizing the Internet.

According to another aspect of the present invention, the system includes a terminal device storing the client software of the subscriber. The client software alerts the subscriber to the incoming call, sends registration and de-registration requests, and sends the subscriber's disposition selection to the ICWS.

According to another aspect of the present invention, when the subscriber's disposition selection comprises accepting the call, the client software sends a de-registration request to the RS and terminates the Internet dial-up connection. The incoming call is then terminated to the subscriber. According to another aspect of the present invention, when the subscriber's disposition selection includes forwarding the call to voice mail, the ISCP instructs the switch to terminate the incoming telephone call to the subscriber and the incoming call is then forwarded to the voice mail service. According to another aspect of the present invention, when the subscriber's disposition selection includes forwarding the call to another number, the ISCP instructs the switch to forward the incoming telephone call to another telephone line. According to another aspect of the present invention, when the subscriber's disposition selection includes playing a message to the caller, the ISCP instructs the switch to play a message to the caller.

According to another aspect of the present invention, the message advises the calling party to attempt the call later. According to another aspect of the present invention, the message advises the calling party that the subscriber will return the call.

The present invention is an AIN based system and method that allows a subscriber connected to the Internet via a dial-up connection to receive caller identification information concerning an incoming telephone call. The information may be provided via a pop-up dialog box on the subscriber's display, which includes but is not limited to a monitor of a personal computer (PC). The information displayed to the subscriber includes the name and number of the calling party, if available. In addition, several disposition options are presented to the subscriber which, upon selection, determine the handling of the incoming call.

The disposition options available to the subscriber include accepting the call, forwarding the call to a voice mail system, redirecting the call to another telephone line (e.g., a cellular telephone or a second telephone line), and playing an announcement to the calling party. The announcement played to the calling party is selected by the subscriber and may be either a message informing the calling party that the party they are trying to reach is busy and that the caller should call back later, or a message informing the calling party that the party they are trying to reach is busy and will call them back later. Additionally, the subscriber has the option of selecting the language in which the messages plays, e.g., English or Spanish.

FIG. 1 illustrates an exemplary telecommunications network 10 of the present invention. The network 10 includes a calling party 28, an originating Service Switching Point (SSP) 30, a terminating SSP 20, a subscriber's telephone 18, a subscriber's personal computer (PC) 25, a display 24, and client software 22. The network also includes a Signaling Transfer Point (STP) 65, a Local Number Portability (LNP) Database 60, a Line Information Database 50, an Integrated Service Control Point (ISCP) 40, an Internet Call Waiting Server (ICWS) 70, a Registration Server (RS) 80, a Heartbeat Server (HS) 90, and the Internet 100.

Exemplary client software 22 includes ICW Client, available from Southwestern Bell Telephone Company.

The SSP 20 is the terminating central office (CO) for the ICID (Internet Caller Identification) subscriber 18 and the SSP 30 is the originating central office for the calling party 28; although, the terminating office and central office may be the same. The SSPs 20 and 30 may comprise, for example, 1AESS or 5ESS switches manufactured by Lucent Technologies, Inc., or DMS-100 switches manufactured by Nortel Networks Corporation (Nortel), or AXE-10 switches manufactured by Telefonaktiebolaget LM Ericsson.

The 1AESS switches may use an AIN Release 0.1 protocol and should be equipped with Generic 1AE13.01 (or higher) software and associated AIN SSP features. The 5ESS switches may utilize an AIN Release 0.1 protocol and should be equipped with Generic 5E12 (or higher) software and associated AIN SSP features. The DMS-100 switches (release NA009) may utilize an AIN Release 0.1 protocol and associated AIN SSP features. The AXE-10 switches may utilize an AIN Release 0.1 protocol and should be equipped with Generic 8.07 (or higher) software and associated AIN SSP features. The call service logic of the present invention may be upgraded to accommodate future AIN releases and protocols and future trigger types. Specifications of AIN Release 0.1 SSPs may be found in Bellcore TR-NWT-001285, Switch-Service Control Point (SCP) Application Protocol Interface Generic Requirements, the disclosure of which is expressly incorporated by reference herein in its entirety.

In order to implement ICID, a Termination Attempt Trigger (TAT) is assigned to an ICID subscriber's directory number or line, depending upon the type of switch. Once the trigger has been assigned and activated, every terminating call to the ICID subscriber's line will cause the SSP 20 to suspend the call and send an AIN query message, via the existing Signaling System 7 (SS7) network (and appropriate STPs 65), to the ICID subscriber's serving ISCP 40 for instructions.

The ISCP 40 stores a Call Processing Record (CPR) for each ICID subscriber and requests information from the other ICID network elements. In particular, the ISCP 40 receives the TAT query from the SSP 20 and responds to the SSP 20 with routing instructions for calls to ICID subscribers.

The RS 80 receives registration requests from the client software 22 when the subscriber logs on to the Internet 100 and activates the ICID service, and stores information related to the ICID subscriber's online Internet status. The RS 80 is the first database accessed by the ISCP 40 during the processing of an ICID call. Based upon the information provided in a GetData query, the RS 80 returns a response containing information associated with requested data elements to the ISCP 40. For example, the RS 80 responds to the GetData query from the ISCP 40 with information about the ICID subscriber's Internet session status.

A GetData query, sent via Transmission Control Protocol/Internet Protocol (TCP/IP), includes an identifier, a service key, and a data element. The identifier indicates that the query is a GetData query, the service key contains an indication of the ICID subscriber for which information is requested and, optionally, security information. The data element is the calling party's name being retrieved.

Additionally, the ISCP 40 uses the LIDB 50, a database, to retrieve calling party name information associated with the calling party's telephone number for transmission to the ICID subscriber via the ICID application. The interface between the LIDB 50 and the ISCP 40 is the Bellcore GetData query provided over the SS7 network. With this interface, the ISCP 40 can receive data from the LIDB 50. To support the GetData query, the ISCP 40 accesses the LIDB 50 with the line number of the calling party in order to obtain the calling party name. Detailed information about the GetData interface may be obtained in Bellcore GR-2838-CORE, Generic Requirements for GetData, the disclosure of which is expressly incorporated by reference herein in its entirety.

If it is determined that the subscriber is online, the ISCP 40 queries the LNP Database 60, in a known manner, to determine if the calling party number received in the TAT query has been ported. The telephone number received in a response from the LNP database is used to determine the calling party name, when it is available.

The ICWS 70 is the communications interface between the ISCP 40 and the ICID client software 22 on the subscriber's terminal. Specifically, the ICWS 70 is receives information related to ICID incoming calls from the ISCP 40 and passes this information directly to the ICID subscriber via TCP/IP utilizing the Internet 100. Further, the ICWS 70 passes de-registration requests from the client software 22 to a Heartbeat Server (HS) 90.

Additionally, the ISCP 40 provides the ICWS 70 with the client software version number running on the subscriber's PC 25. Subsequently, the ICWS 70 determines if the subscriber has the latest version of the client software. If the ICWS 70 determines that the subscriber does not have the latest version of the client software, it notifies the subscriber that they need to update their client software. This notification is given when the ICWS 70 passes the caller identification information to the subscriber.

During the course of an active Internet session with ICID service turned ON, the client software 22 periodically transmits heartbeat messages via TCP/IP utilizing the Internet 100 to the HS 90. In response, the HS 90 updates the RS 80 via TCP/IP with the subscriber's online status, and notifies the RS 80 in situations where there is an interruption of heartbeat messages from the client software 22, indicating a possible undesired disconnection of the Internet session. Additionally, if the subscriber currently connected to the Internet 100 elects to accept an incoming telephone call (as will be discussed later), the client software 22 sends a de-registration request, which is passed to the HS 90.

After the RS 80 receives a registration request from the client software 22, the RS 80 sends a heartbeat setup message to the HS 90 via TCP/IP to alert it to expect to receive heartbeat messages from the client. As a result, the HS 90 begins to receive keep-alive messages from the client after the registration is completed. If the client sends a keep-alive message that does not match the information in the HS 90 memory, then the HS 90 sends a registration database query to the RS 80 via TCP/IP. If the query results match the data received, the copy in memory is updated. If the results of the query do not match, the HS 90 opens a TCP session to send a message instructing the client to re-register with the RS 80.

The interface between the ISCP 40 and the RS 80 and between the ISCP 40 and the ICWS 70 is the Bellcore Generic Data Interface (GDI) for (TCP/IP). This interface provides the capability to send/receive transactions to and from external systems over TCP/IP using Transaction Capabilities Application Part (TCAP) messages. The ISCP 40 can get data, send data, or invoke an application (InvokeApp) from a database such as the RS 80 or ICWS 70. More information may be obtained from Bellcore SR-3389, ISCP Generic Data, Interface Specification for TCP/IP, Version 5.0, Issue 2, January 1997, the disclosure of which is expressly incorporated by reference herein in its entirety.

The Internet Caller Identification Client Software 22 is the subscriber interface for the ICID service. The client software 22 permits the subscriber to turn the ICID service ON or OFF as desired, choose preset options, and select call disposition options. An InvokeApp message is used to invoke the ICID application on the ICWS 70 and to return the ICID subscriber's selected disposition option. Additionally, the client software 22 provides a visual and audible alert to the subscriber of an incoming telephone call, sends Internet registration and de-registration requests, sends the subscriber's option selection to the ICWS 70, and sends heartbeat messages to the HS 90.

An InvokeApp message, sent via TCP/IP, consists of an originating SysID identifying the client sending the message, an accessID identifying the sending client process at the sending site, a receiverID identifying the server software system receiving the request, an appName identifying the application process within the receiving server software, an actionID identifying the type of requested action, a securityID, and a set of tagged parameters.

Figure 2:
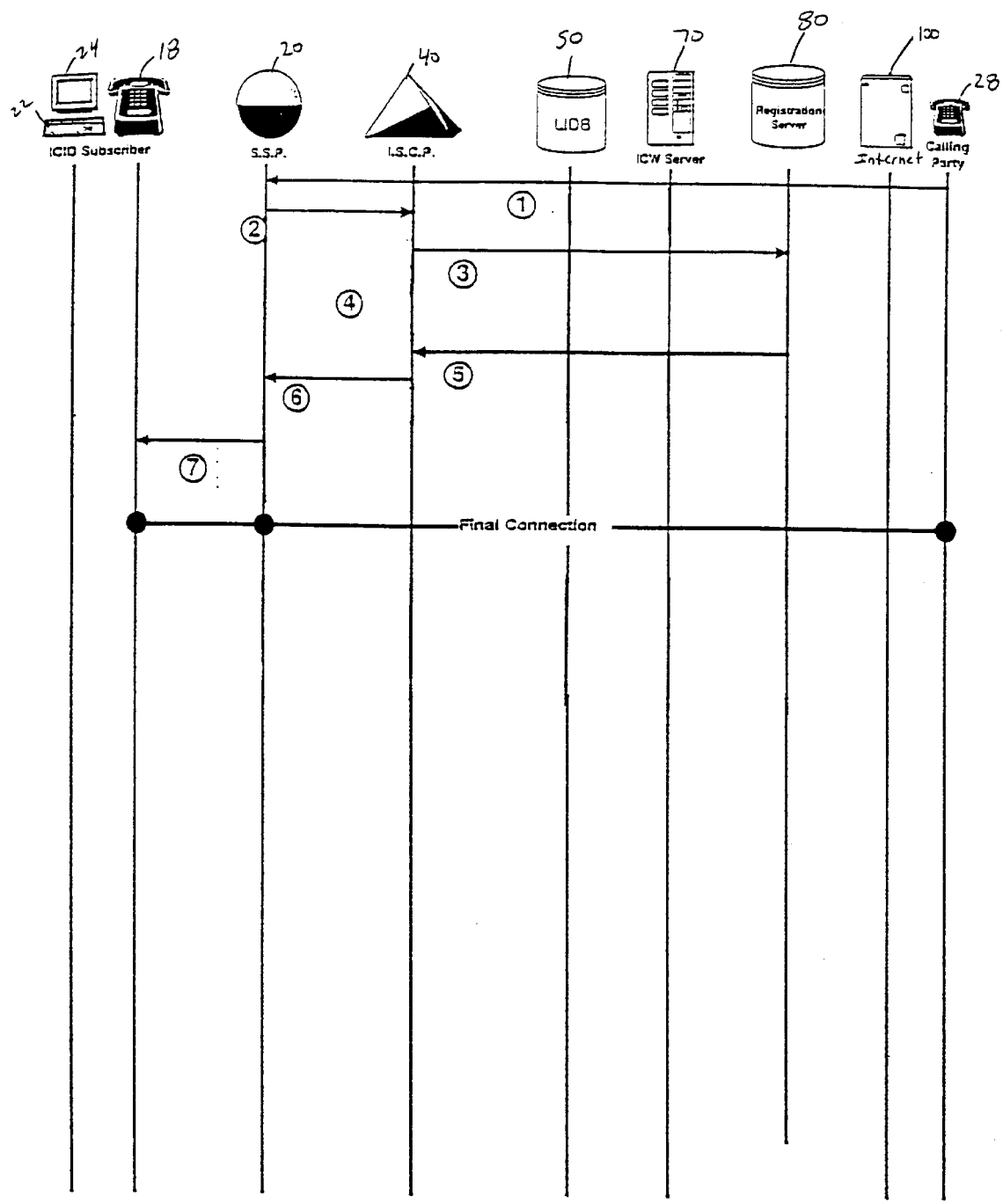
FIG. 2 is an exemplary ICID call flow diagram in which ICID has been deactivated, or when no active Internet session exists, according to an aspect of the present invention.

Exemplary call flows, according to an embodiment of the invention will now be discussed. FIG. 2 is an ICID call flow diagram in which the ICID service has been turned OFF, or no active Internet session exists. At step 1, a telephone call is placed to an ICID subscriber. A TAT in the terminating CO SSP 20 causes the call to be suspended at the SSP 20. The trigger also causes the SSP 20 to transmit an AIN query message including the CPN (if available) and called party number (CDN) via the SS7 network and the appropriate STPs 65 to the ICID subscriber's serving ISCP 40 at step 2. At step 3, the ISCP 40 sends a GetData query to the RS 80 with the called party's telephone number to request the online status of the ICID subscriber. At step 4, the ISCP 40 sets a timer equal to a predetermined time, e.g., 2 seconds. In the event that the RS 80 does not respond within the predetermined time (indicating a timeout condition) or responds with an error, the ISCP 40 sends an Authorize Termination response to the SSP 20. As a result, the SSP 20 terminates the suspended telephone call at the subscriber's line and the call may encounter features programmed on the line, e.g., call waiting, call forwarding, etc.

If it is determined at the RS 80 that the subscriber is not currently online or the subscriber has the ICID turned OFF, the RS 80 responds with a "0". In this scenario, because the subscriber is not online or the subscriber has the ICID turned OFF, the RS 80 responds to the ISCP 40 at step 5 with a "0". The ISCP 40 then sends an Authorize Termination response to the SSP 20 at step 6, which terminates the call to the subscriber's telephone line at step 7. As a result, a connection is made between the calling party and the subscriber. As the call attempts to terminate, it encounters any features programmed on the ICID subscriber's telephone line, e.g., call waiting, call forwarding, etc.

Figure 3:
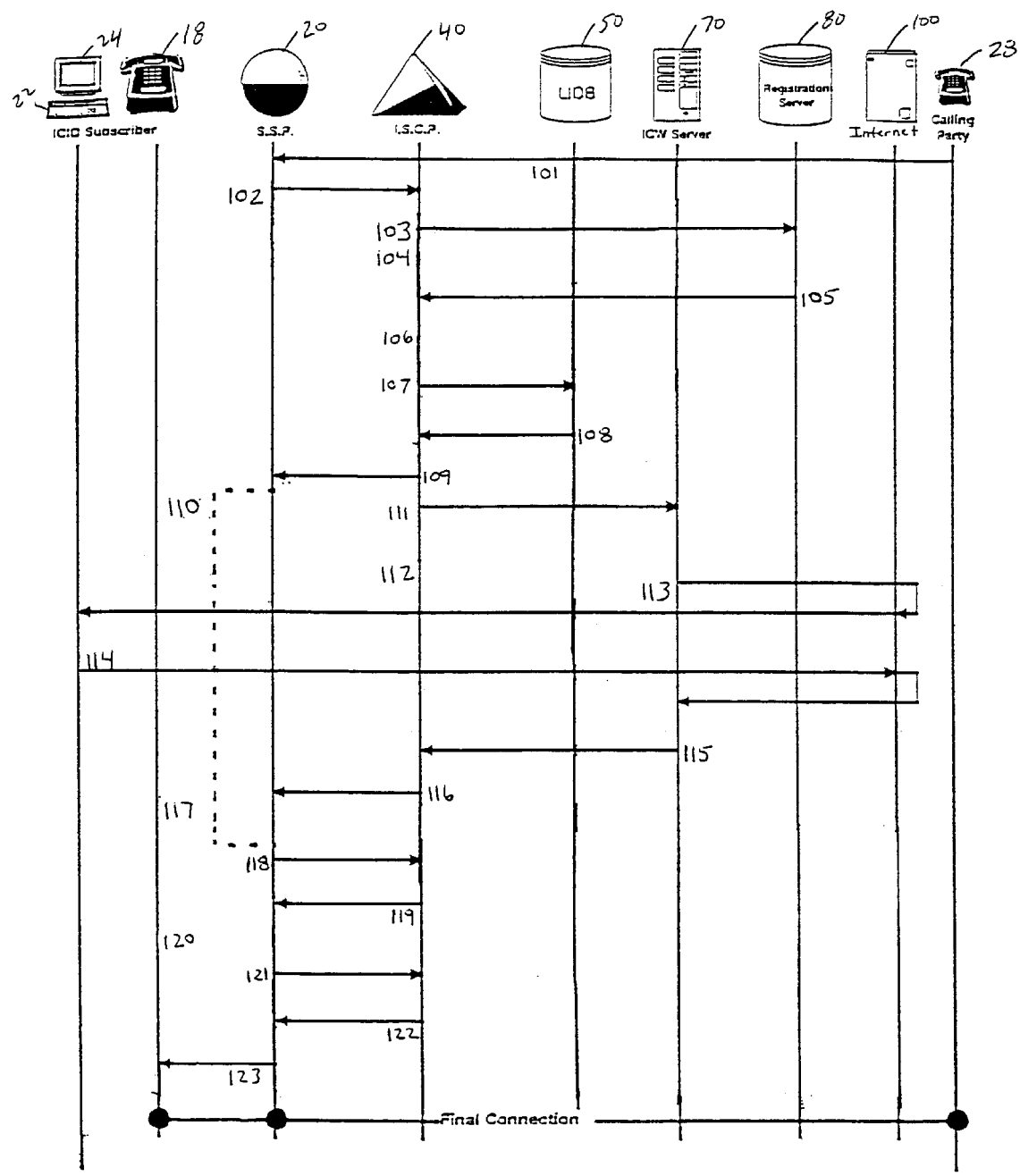
FIG. 3 is an exemplary ICID call flow diagram in which the ICID subscriber elects to accept the incoming telephone call, according to an aspect of the present invention.

FIG. 3 is an ICID call flow diagram in which the ICID subscriber elects to accept the incoming telephone call. At step 101, a telephone call is placed to an ICID subscriber. A TAT in the terminating CO SSP 20 causes the call to be suspended at the SSP 20. The trigger also causes the SSP 20 to transmit an AIN query message including the CPN (if available) and CDN via the SS7 network and the appropriate STPs 65 to the ICID subscriber's serving ISCP 40 at step 102. At step 103, the ISCP 40 sends a GetData query to the RS 80 with the called party's telephone number to request the online status of the ICID subscriber. At step 104, the ISCP 40 sets a timer equal to a predetermined time, e.g., 2 seconds. In the event that the RS 80 does not respond within the predetermined time (indicating a timeout condition) or responds with an error, the ISCP 40 sends an Authorize Termination response to the SSP 20. As a result, the SSP 20 terminates the suspended telephone call at the subscriber's line and the call may encounter features programmed on the line, e.g., call waiting, call forwarding, etc.

If the subscriber is online with ICID service active, the RS 80 responds with a "1" indicating the subscriber is online. The RS 80 also responds with the IP address, port number, and subscriber key information for the ICID subscriber's Internet session. In this scenario, because the subscriber is online with ICID turned ON, the RS 80 responds to the ISCP 40 at step 105 with a "1". At step 106, a check is performed at the ISCP 40 to determine whether the subscriber has voice mail service.

Also at step 106, a check is performed at the ISCP 40 to determine whether the Presentation Restriction (PR) value is restricted or unavailable. If the Presentation Restriction value is restricted and the called party subscribes to Anonymous Call Rejection (ACR) service, an Authorize Termination response is sent to the SSP 20 allowing the call to be rejected. ACR prevents calls to subscribers when a calling party blocks their number.

If the calling party number was delivered with the query and the Presentation Restriction indicator for the incoming call is allowed, the ISCP 40 launches a query to the Local Number portability database to determine whether the received CPN is ported. The telephone number returned in the response is either equal to the CPN sent in the query if the telephone number is not ported or the Local Routing Number (LRN) if the telephone number is ported. The Telephone number from the response is used as the CPN and checked against entries in a table to determine if the NPA-NXX belongs to a participating Local Exchange Carrier (LEC). A participating LEC is one that provides data from their LIDB, or allows access to their LIDB.

If the CPN is found to be a participating LEC, a GetData query is launched to the LIDB 50 at step 107 to retrieve the calling party's name. If the CPN was not delivered with the query, or there is no participating LEC, or the Presentation Restriction indicator for the incoming call is anonymous or unavailable, the ISCP 40 will not launch a GetData query to the LIDB 50 to retrieve the calling party's name. In this event, the calling party name is null in the InvokeApp query to the ICWS 70. If available, the calling party's name is sent to the ISCP 40 from the LIDB 50 at step 108.

At step 109, the ISCP 40 instructs the SSP 20 to play a "please hold" announcement to the calling party to request the calling party to hold the line (step 110). At step 111, the ISCP 40 sends an InvokeApp request to the ICWS 70. The request contains the CDN, CPN (if available and not presentation restricted), the calling party name (if available and not presentation restricted), IP address, port number, client software version, and an indicator as to whether or not the ICID subscriber has voice mail service.

At step 112, the ISCP 40 sets a timer equal to a predetermined time, e.g., 25 seconds. In the event that the ICWS 70 does not respond within the predetermined time (indicating a timeout condition) or responds with an error, the ISCP 40 instructs the SSP 20 to stop playing the "please hold" announcement to the caller. Then, the SSP 20 begins playing an announcement to the caller. When voice mail is available, the message informs the caller that the call is being forwarded to a voice mail service. Lastly, the ISCP 40 sends an Authorize Termination response to the SSP 20. If the subscriber does not have voice mail service, an error is reported and the ISCP 40 sends an Authorize Termination response to the SSP 20. As a result, the SSP 20 terminates the suspended telephone call to the subscriber's telephone line and the call encounters any other features programmed on the line, e.g., call waiting, call forwarding, etc.

If no timeout occurs, at step 113 the ICWS 70 sends a message via the Internet 100 to the ICID subscriber, which appears on the subscriber's display, informing the subscriber of the incoming call and presenting the subscriber with disposition options for the call. The message displayed may be a pop-up dialog box. At step 114, the ICID subscriber elects to accept the telephone call, and as a result, the client software 22 responds to the ICWS 70 with option 1 and will send a de-registration message to the RS 80, and begin to terminate the subscriber's Internet session. The ICWS 70 passes the subscriber's option 1 selection to the ISCP 40 at step 115. At step 116, the ISCP 40 instructs the SSP 20 to stop playing the "please hold" announcement to the caller. At step 117, the "please hold" announcement is terminated by the SSP 20 and at Step 118, the SSP 20 sends a Resource Clear message to the ISCP 40 confirming that the message is no longer playing. At step 119, the ISCP 40 instructs the SSP 20 to begin playing a "will take your call" announcement to the caller (step 120). At step 121, the SSP 20 sends a Resource Clear message to the ISCP 40. At the conclusion of the "will take your call" announcement, the ISCP 40 sends an Authorize Termination response to the SSP 20 which terminates the suspended call to the subscriber's telephone line (steps 122–123). That is, the calling party is connected to the subscriber.

Figure 4:
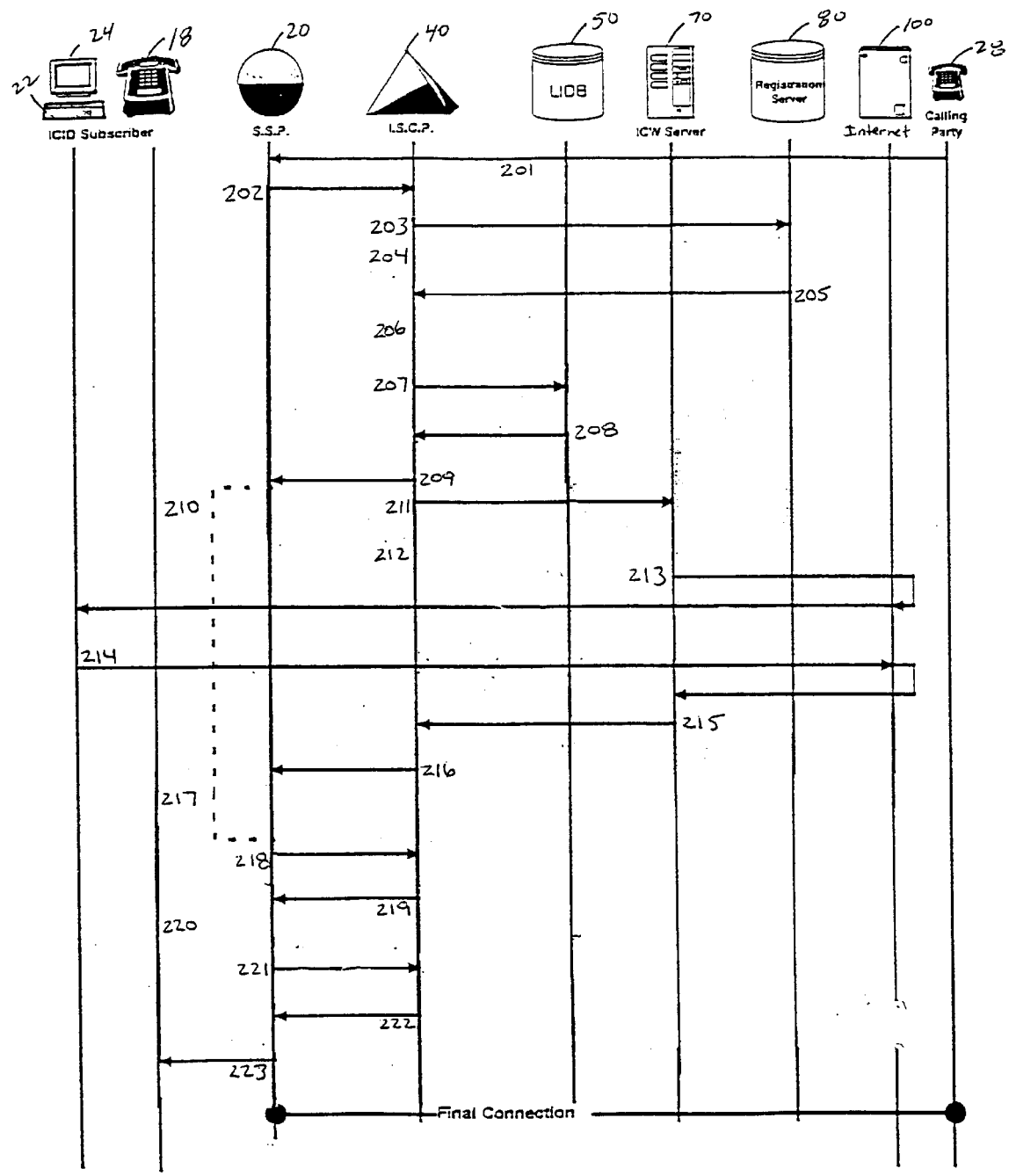
FIG. 4 is an exemplary ICID call flow diagram in which the ICID subscriber elects to forward the incoming telephone call to voice mail, according to an aspect of the present invention.

FIG. 4 is an ICID call flow diagram in which the ICID subscriber elects to forward the incoming telephone call to voice mail service. At step 201, a telephone call is placed to an ICID subscriber. A TAT in the terminating CO SSP 20 causes the call to be suspended at the SSP 20. The trigger also causes the SSP 20 to transmit an AIN query message including the CPN (if available) and CDN via the SS7 network and the appropriate STPs 65 to the ICID subscriber's serving ISCP 40 at step 202. At step 203, the ISCP 40 sends a GetData query to the RS 80 with the called party's telephone number to request the online status of the ICID subscriber. At step 204, the ISCP 40 sets a timer equal to a predetermined time, e.g., 2 seconds. In the event that the RS 80 does not respond within the predetermined time (indicating a timeout condition) or responds with an error, the ISCP 40 sends an Authorize Termination response to the SSP 20. As a result, the SSP 20 terminates the suspended telephone call at the subscriber's line and the call may encounter features programmed on the line, e.g., call waiting, call forwarding, etc.

If the subscriber is online with ICID service active, the RS 80 responds with a "1" indicating the subscriber is online. The RS 80 also responds with the IP address, port number, and subscriber key information for the ICID subscriber's Internet session. In this scenario, because the subscriber is online with ICID turned ON, the RS 80 responds to the ISCP 40 at step 205 with a "1". At step 206, a check is performed at the ISCP 40 to confirm that the subscriber has voice mail service.

Also at step 206, a check is performed at the ISCP 40 to determine whether the Presentation Restriction value is restricted or unavailable. If the Presentation Restriction value is restricted and the called party subscribes to Anonymous Call Rejection (ACR) service, an Authorize Termination response is sent to the SSP 20 allowing the call to be rejected.

If the calling party number was delivered with the query and the presentation restriction indicator for the incoming call is allowed, the ISCP 40 launches a query to the Local Number portability database to determine whether the received CPN is ported. The telephone number returned in the response is either equal to the CPN sent in the query when the telephone number is not ported or the LRN when the telephone number is ported. The telephone number from the response is used as the CPN and checked against entries in a table to determine if the NPA-NXX belongs to a participating LEC. If the CPN is found to be a participating LEC, a GetData query is launched to the LIDB 50 at step 207 to retrieve the calling party's name. If the CPN was not delivered with the query, or there is no participating LEC, or the Presentation Restriction indicator for the incoming call is anonymous or unavailable, the ISCP 40 will not launch a GetData query to the LIDB 50 to retrieve the calling party's name. In this event, the calling party name is null in the InvokeApp query to the ICWS 70. If available, the calling party's name is sent to the ISCP 40 from the LIDB 50 at step 208.

At step 209, the ISCP 40 instructs the SSP 20 to play a "please hold" announcement to the calling party to request the calling party to hold the line at step 210. At step 211, the ISCP 40 sends an InvokeApp request to the ICWS 70. The request contains the CDN, CPN (if available and not presentation restricted), the calling party name (if available and not presentation restricted), IP address, port number, client software version, and an indicator that the ICID subscriber has voice mail service.

At step 212, the ISCP 40 sets a timer equal to a predetermined time, e.g., 25 seconds. In the event that the ICWS 70 does not respond within the predetermined time (indicating a timeout condition) or responds with an error, the ISCP 40 instructs the SSP 20 to stop playing the "please hold" announcement to the caller. Then, the SSP 20 begins playing an announcement to the caller informing the caller that the call is being forwarded to a voice mail service. Lastly, the ISCP 40 sends an Authorize Termination response to the SSP 20. If the subscriber does not have voice mail service, an error is reported and the ISCP 40 sends an Authorize Termination response to the SSP 20. As a result, the SSP 20 terminates the suspended telephone call to the subscriber's line and the call encounters any other features programmed on the line, e.g., call waiting, call forwarding, etc.

If no timeout occurs, at step 213 the ICWS 70 sends a message via the Internet 100 to the ICID subscriber, which appears on the subscriber's display, informing the subscriber of the incoming call and presenting the subscriber with disposition options for the call. The displayed message may be a pop-up dialog box. At step 214, the ICID subscriber elects option 2 to send the incoming telephone call to voice mail service, and as a result, the client software 22 responds to the ICWS 70 and will not terminate the subscriber's Internet session. The ICWS 70 passes the subscriber's option 2 selection to the ISCP 40 at step 215. At step 216, the ISCP 40 instructs the SSP 20 to stop playing the "please hold" announcement to the caller. At step 217, the "please hold" announcement is terminated by the SSP 20 and at step 218, the SSP 20 sends a Resource Clear message to the ISCP 40 confirming that the message is no longer playing. At step 219, the ISCP 40 instructs the SSP 20 to begin playing a "forwarding to voice mail service" announcement to the caller (step 220). At step 221, the SSP 20 sends a Resource Clear message to the ISCP 40. At the conclusion of the "forwarding to voice mail service" announcement, the ISCP 40 sends an Authorize Termination response to the SSP 20 which terminates the suspended call to the subscriber's busy telephone line (steps 222–223). As the call attempts to terminate at the subscriber's line, the call encounters programming associated with voice mail service and the call is forwarded accordingly. Ultimately, the calling party is connected with the subscriber's voice mail box and has the option of leaving a message.

Figure 5:
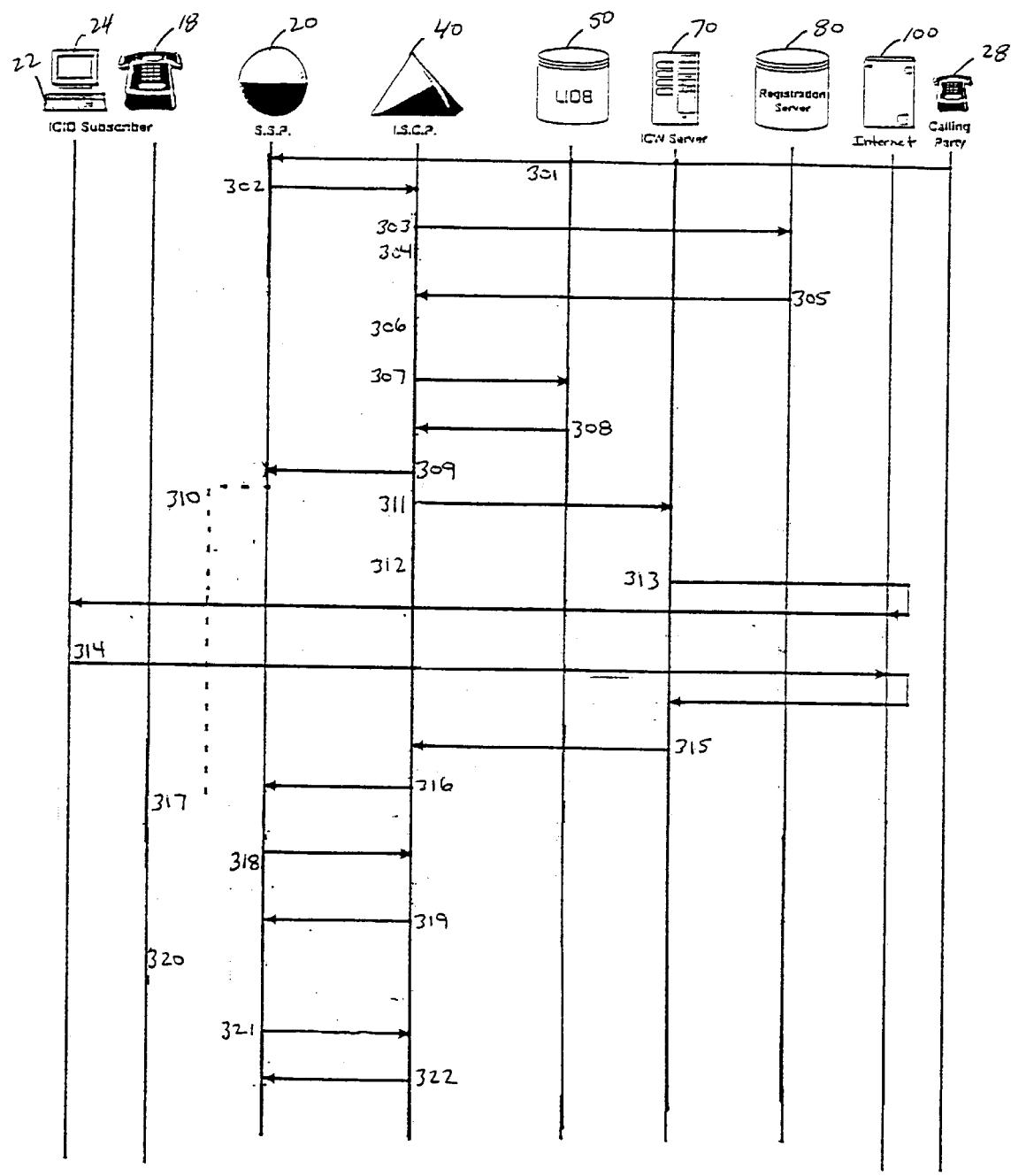
FIG. 5 is an exemplary ICID call flow diagram in which the ICID subscriber elects to play an announcement to the caller, according to an aspect of the present invention.

FIG. 5 is an ICID call flow diagram in which the ICID subscriber elects to send the incoming telephone call to an announcement. At step 301, a telephone call is placed to an ICID subscriber. A TAT in the terminating CO SSP 20 causes the call to be suspended at the SSP 20. The trigger also causes the SSP 20 to transmit an AIN query message including the CPN (if available) and CDN via the SS7 network and the appropriate STPs 65 to the ICID subscriber's serving ISCP 40 at step 302. At step 303, the ISCP 40 sends a GetData query to the RS 80 with the called party's telephone number to request the online status of the ICID subscriber. At step 304, the ISCP 40 sets a timer equal to a predetermined time, e.g., 2 seconds. In the event that the RS 80 does not respond within the predetermined time (indicating a timeout condition) or responds with an error, the ISCP 40 sends an Authorize Termination response to the SSP 20. As a result, the SSP 20 terminates the suspended telephone call at the subscriber's line and the call may encounter features programmed on the line, e.g., call waiting, call forwarding, etc.

If the subscriber is online with ICID service active, the RS 80 responds with a "1" indicating the subscriber is online. The RS 80 also responds with the IP address, port number, and subscriber key information for the ICID subscriber's Internet session. In this scenario, because the subscriber is online with ICID turned ON, the RS 80 responds to the ISCP 40 at step 305 with a "1". At step 306, a check is performed at the ISCP 40 to determine whether the subscriber has voice mail service.

Also at step 306, a check is performed at the ISCP 40 to determine whether the Presentation Restriction value is restricted or unavailable. If the Presentation Restriction value is restricted and the called party subscribes to Anonymous Call Rejection (ACR) service, an Authorize Termination response is sent to the SSP 20 allowing the call to be rejected.

If the calling party number was delivered with the query and the presentation restriction indicator for the incoming call is allowed, the ISCP 40 launches a query to the Local Number portability database to determine whether the received CPN is ported. The telephone number returned in the response is either equal to the CPN sent in the query if the telephone number is not ported or the LRN if the telephone number is ported. The telephone number from the response is used as the CPN and checked against entries in a table to determine if the NPA-NXX belongs to a participating LEC. If the CPN is found to be a participating LEC, a GetData query is launched to the LIDB 50 at step 307 to retrieve the calling party's name. If the CPN was not delivered with the query, or there is no participating LEC, or the Presentation Restriction indicator for the incoming call is anonymous or unavailable, the ISCP 40 will not launch a GetData query to the LIDB 50 to retrieve the calling party's name. In this event, the calling party name is null in the InvokeApp query to the ICWS 70. If available, the calling party's name is sent to the ISCP 40 from the LIDB 50 at step 308.

At step 309, the ISCP 40 instructs the SSP 20 to play a "please hold" announcement to the calling party to request the calling party to hold the line at step 310. At step 311, the ISCP 40 sends an InvokeApp request to the ICWS 70. The request contains the CDN, CPN (if available and not presentation restricted), the calling party name (if available and not presentation restricted), IP address, port number, client software version, and an indicator as to whether or not the ICID subscriber has voice mail service.

At step 312, the ISCP sets a timer equal to a predetermined time, e.g., 25 seconds. In the event that the ICWS 70 does not respond within the predetermined time (indicating a timeout condition) or responds with an error, the ISCP 40 instructs the SSP 20 to stop playing the "please hold" announcement to the caller. Then, the SSP 20 begins playing an announcement to the caller informing the caller that the call is being forwarded to a voice mail service. Lastly, the ISCP 40 sends an Authorize Termination response to the SSP 20. If the subscriber does not have voice mail service, an error is reported and the ISCP 40 sends an Authorize Termination response to the SSP 20. As a result, the SSP 20 terminates the suspended telephone call at the subscriber's line and the call encounters any other features programmed on the line, e.g., call waiting, call forwarding, etc.

If no timeout occurs, at step 313 the ICWS 70 sends a message via the Internet 100 to the ICID subscriber, which appears on the subscriber's display, informing the subscriber of the incoming call and presenting the subscriber with disposition options for the call. The message displayed may be a pop-up dialog box.

At step 314, the ICID subscriber elects to send the telephone call to an announcement, and as a result, the client software 22 responds to the ICWS 70 with the announcement selection number, which consists of two choices. The first message that may be played advises the caller that the subscriber is busy and that the caller should call back later. The second option advises the caller that the subscriber is busy and that the subscriber will return the call to the caller at a later time.

The ICWS 70 passes the subscriber's option selection to the ISCP 40 at step 315. At step 316, the ISCP 40 instructs the SSP 20 to stop playing the "please hold" announcement to the caller. At step 317, the "please hold" announcement is terminated by the SSP 20 and at step 318, the SSP 20 sends a Resource Clear message to the ISCP 40 confirming that the message is no longer playing. At step 319, the ISCP 40 instructs the SSP 20 to begin playing the selected announcement (step 320). At step 321, the SSP 20 sends a Resource Clear message to the ISCP 40. At the conclusion of the selected announcement, the call is disconnected at step 322.

Figure 6:
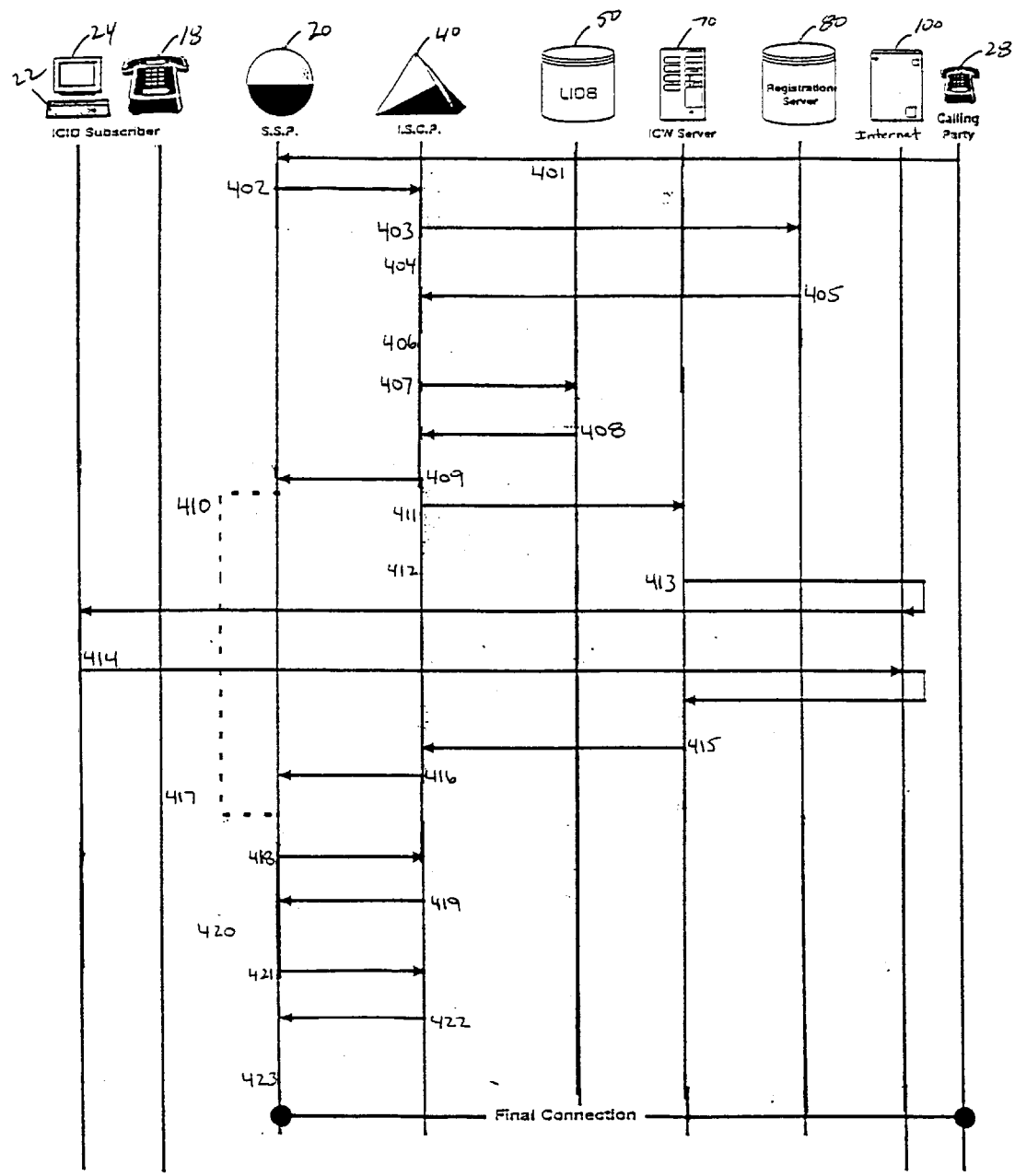
FIG. 6 is an exemplary ICID call flow diagram in which the ICID subscriber elects to redirect the incoming telephone call to an alternate telephone number, according to an aspect of the present invention.

FIG. 6 is an ICID call flow diagram in which the ICID subscriber elects to forward the incoming telephone call to another telephone line. At step 401, a telephone call is placed to an ICID subscriber. A TAT in the terminating CO SSP 20 causes the call to be suspended at the SSP 20. The trigger also causes the SSP 20 to transmit an AIN query message including the CPN (if available) and CDN via the SS7 network and the appropriate STPs 65 to the ICID subscriber's serving ISCP 40 at step 402. At step 403, the ISCP 40 sends a GetData query to the RS 80 with the called party's telephone number to request the online status of the ICID subscriber. At step 404, the ISCP 40 sets a timer equal to a predetermined time, e.g., 2 seconds. In the event that the RS 80 does not respond within the predetermined time (indicating a timeout condition) or responds with an error, the ISCP 40 sends an Authorize Termination response to the SSP 20. As a result, the SSP 20 terminates the suspended telephone call at the subscriber's line and the call may encounter features programmed on the line, e.g., call waiting, call forwarding, etc.

If the subscriber is online with ICID service active, the RS 80 responds with a "1" indicating the subscriber is online. The RS 80 also responds with the IP address, port number, and subscriber key information for the ICID subscriber's Internet session. In this scenario, because the subscriber is online with ICID turned ON, the RS 80 responds to the ISCP 40 at step 405 with a "1". At step 406, a check is performed at the ISCP 40 to determine whether the subscriber has voice mail service.

Also at step 406, a check is performed at the ISCP 40 to determine whether the Presentation Restriction value is restricted or unavailable. If the Presentation Restriction value is restricted and the called party subscribes to Anonymous Call Rejection (ACR) service, an Authorize Termination response is sent to the SSP 20 allowing the call to be rejected.

If the calling party number was delivered with the query and presentation restriction indicator for the incoming call is allowed, the ISCP 40 launches a query to the Local Number portability database to determine whether the received CPN is ported. The telephone number returned in the response is either equal to the CPN sent in the query if the telephone number is not ported or the LRN if the telephone number is ported. The telephone number from the response is used as the CPN and checked against entries in a table to determine if the NPA-NXX belongs to a participating LEC. If the CPN is found to be a participating LEC, a GetData query is launched to the LIDB 50 at step 407 to retrieve the calling party's name. If the CPN was not delivered with the query, or there is no participating LEC, or the Presentation Restriction indicator for the incoming call is anonymous or unavailable, the ISCP 40 will not launch a GetData query to the LIDB 50 to retrieve the calling party's name. In this event, the calling party name is null in the InvokeApp query to the ICWS 70. If available, the calling party's name is sent to the ISCP 40 from the LIDB 50 at step 408.

At step 409, the ISCP 40 instructs the SSP 20 to play a "please hold" announcement to the calling party to request the calling party to hold the line at step 410. At step 411, the ISCP 40 sends an InvokeApp request to the ICWS 70. The request contains the CDN, CPN (if available and not presentation restricted), the calling party name (if available and not presentation restricted), IP address, port number, client software version, and an indicator as to whether or not the ICID subscriber has voice mail service.

At step 412, the ISCP sets a timer equal to a predetermined time, e.g., 25 seconds. In the event that the ICWS 70 does not respond within the predetermined time (indicating a timeout condition) or responds with an error, the ISCP 40 instructs the SSP 20 to stop playing the "please hold" announcement to the caller. Then, the SSP 20 begins playing an announcement to the caller informing the caller that the call is being forwarded to a voice mail service. Lastly, the ISCP 40 sends an Authorize Termination response to the SSP 20. If the subscriber does not have voice mail service, an error is reported and the ISCP 40 sends an Authorize Termination response to the SSP 20. As a result, the SSP 20 terminates the suspended telephone call at the subscriber's line and the call encounters any other features programmed on the line, e.g., call waiting, call forwarding, etc.

If no timeout occurs, at step 413 the ICWS 70 sends a message via the Internet 100 to the ICID subscriber, which appears on the subscriber's display, informing the subscriber of the incoming call and presenting the subscriber with disposition options for the call. The message displayed may be a pop-up dialog box. At step 414, the ICID subscriber elects option 3 to redirect the call to another telephone number, and as a result, the client software 22 responds to the ICWS 70 with option 3 and a ten digit "forward to" telephone number as selected by the subscriber. The ICWS 70 passes the subscriber's option 3 selection and the selected ten digit "forward to" telephone number to the ISCP 40 at step 415.

At step 416, the ISCP 40 instructs the SSP 20 to stop playing the "please hold" announcement to the caller. At step 417, the "please hold" announcement is terminated by the SSP 20 and at step 418 the SSP 20 sends a Resource Clear message to the ISCP 40 confirming that the message is no longer playing. At step 419, the ISCP 40 instructs the SSP 20 to begin playing a "forwarding to another number" announcement to the caller (step 420). At step 421, the SSP 20 sends a Resource Clear Message to the ISCP 40. At the conclusion of the "forwarding to another number" announcement, the ISCP 40 sends a Forward Call response to the SSP 20 which initiates the process of forwarding the call to the specified telephone number (steps 422–423). Ultimately, the calling party is connected to the forwarded number.

Figure 7:
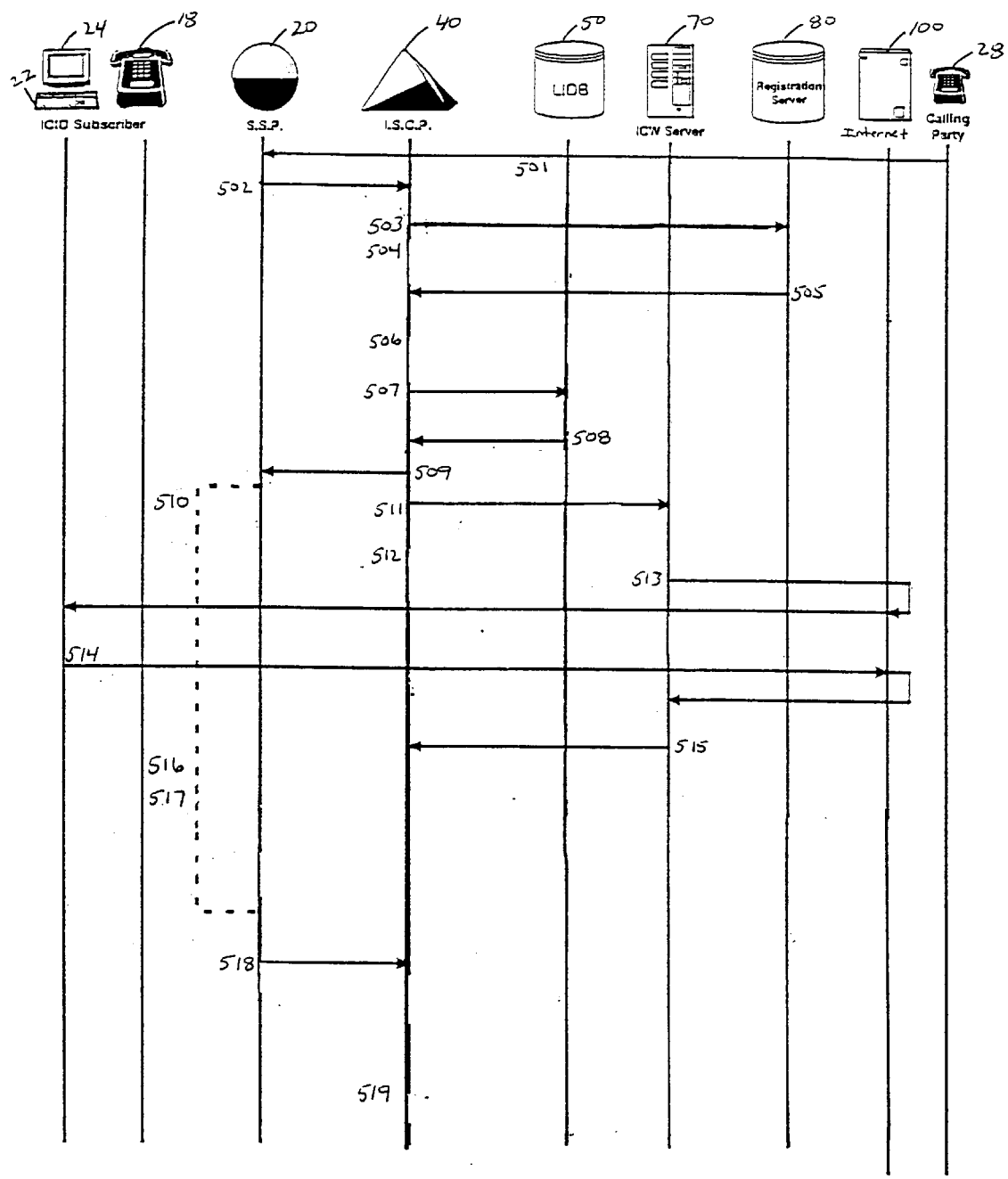
FIG. 7 is an exemplary ICID call flow diagram in which the calling party abandons the telephone call to the ICID subscriber after a response from the ICW server, according to an aspect of the present invention.

FIG. 7 is an ICID call flow diagram in which the caller abandons the telephone call after a response from the ICWS 70. At step 501, a telephone call is placed to an ICID subscriber. A TAT in the terminating CO SSP 20 causes the call to be suspended at the SSP 20. The trigger also causes the SSP 20 to transmit an AIN query message including the CPN (if available) and CDN via the SS7 network and the appropriate STPs 65 to the ICID subscriber's serving ISCP 40 at step 502. At step 503, the ISCP 40 sends a GetData query to the RS 80 with the called party's telephone number to request the online status of the ICID subscriber. At step 504, the ISCP 40 sets a timer equal to a predetermined time, e.g., 2 seconds. In the event that the RS 80 does not respond within the predetermined time (indicating a timeout condition) or responds with an error, the ISCP 40 sends an Authorize Termination response to the SSP 20. As a result, the SSP 20 terminates the suspended telephone call at the subscriber's line and the call may encounter features programmed on the line, e.g., call waiting, call forwarding, etc.

If the subscriber is online with ICID service active, the RS 80 responds with a "1" indicating the subscriber is online. The RS 80 also responds with the IP address, port number, and subscriber key information for the ICID subscriber's Internet session. In this scenario, because the subscriber is online with ICID turned ON, the RS 80 responds to the ISCP 40 at step 505 with a "1". At step 506, a check is performed at the ISCP 40 to determine whether the subscriber has voice mail service.

Also at step 506, a check is performed at the ISCP 40 to determine whether the Presentation Restriction value is restricted or unavailable. If the Presentation Restriction value is restricted and the called party subscribes to Anonymous Call Rejection (ACR) service, an Authorize Termination response is sent to the SSP 20 allowing the call to be rejected.

If the calling party number was delivered with the query and the presentation restriction indicator for the incoming call is allowed, the ISCP 40 launches a query to the Local Number portability database to determine whether the received CPN is ported. The telephone number returned in the response is either equal to the CPN sent in the query if the telephone number is not ported or the LRN if the telephone number is ported. The telephone number from the response is used as the CPN and checked against entries in a table to determine if the NPA-NXX belongs to a participating LEC. If the CPN is found to be a participating LEC, a GetData query is launched to the LIDB 50 at step 507 to retrieve the calling party's name. If the CPN was not delivered with the query, or there is no participating LEC, or the Presentation Restriction indicator for the incoming call is anonymous or unavailable, the ISCP 40 will not launch a GetData query to the LIDB 50 to retrieve the calling party's name. In this event, the calling party name is null in the InvokeApp query to the ICWS 70. If available, the calling party's name is sent to the ISCP 40 from the LIDB 50 at step 508.

At step 509, the ISCP 40 instructs the SSP 20 to play a "please hold" announcement to the calling party to request the calling party to hold the line at step 510. At step 511, the ISCP 40 sends an InvokeApp request to the ICWS 70. The request contains the CDN, CPN (if available and not presentation restricted), the calling party name (if available and not presentation restricted), IP address, port number, client software version, and an indicator as to whether the ICID subscriber has voice mail service.

At step 512, the ISCP 40 sets a timer equal to a predetermined time, e.g., 25 seconds. In the event that the ICWS 70 does not respond within the predetermined time (indicating a timeout condition) or responds with an error, the ISCP 40 instructs the SSP 20 to stop playing the "please hold" announcement to the caller. Then, the SSP 20 begins playing an announcement to the caller informing the caller that the call is being forwarded to a voice mail service. Lastly, the ISCP 40 sends an Authorize Termination response to the SSP 20. If the subscriber does not have voice mail service, an error is reported and the ISCP 40 sends an Authorize Termination response to the SSP 20. As a result, the SSP 20 terminates the suspended telephone call at the subscriber's line and the call encounters any other features programmed on the line, e.g., call waiting, call forwarding, etc.

At step 513 the ICWS 70 sends a message via the Internet 100 to the ICID subscriber, which appears on the subscriber's display, informing the subscriber of the incoming call and presenting the subscriber with disposition options for call handling. The message displayed may be a pop-up dialog box. At step 514, the ICID subscriber elects a call disposition option to control the call, and as a result, the client software 22 responds to the ICWS 70 with the option. The ICWS 70 passes the subscriber's option selection to the ISCP 40 at step 515.

At step 516, the caller abandons the telephone call by hanging up, in which case the SSP 20 stops playing the "please hold" announcement to the caller at step 517 and at step 518, the SSP 20 sends a Resource Clear message to the ISCP 40 due the abandonment of the telephone call by the caller. At step 519, the ISCP 40 terminates CPR processing.

Figure 8:
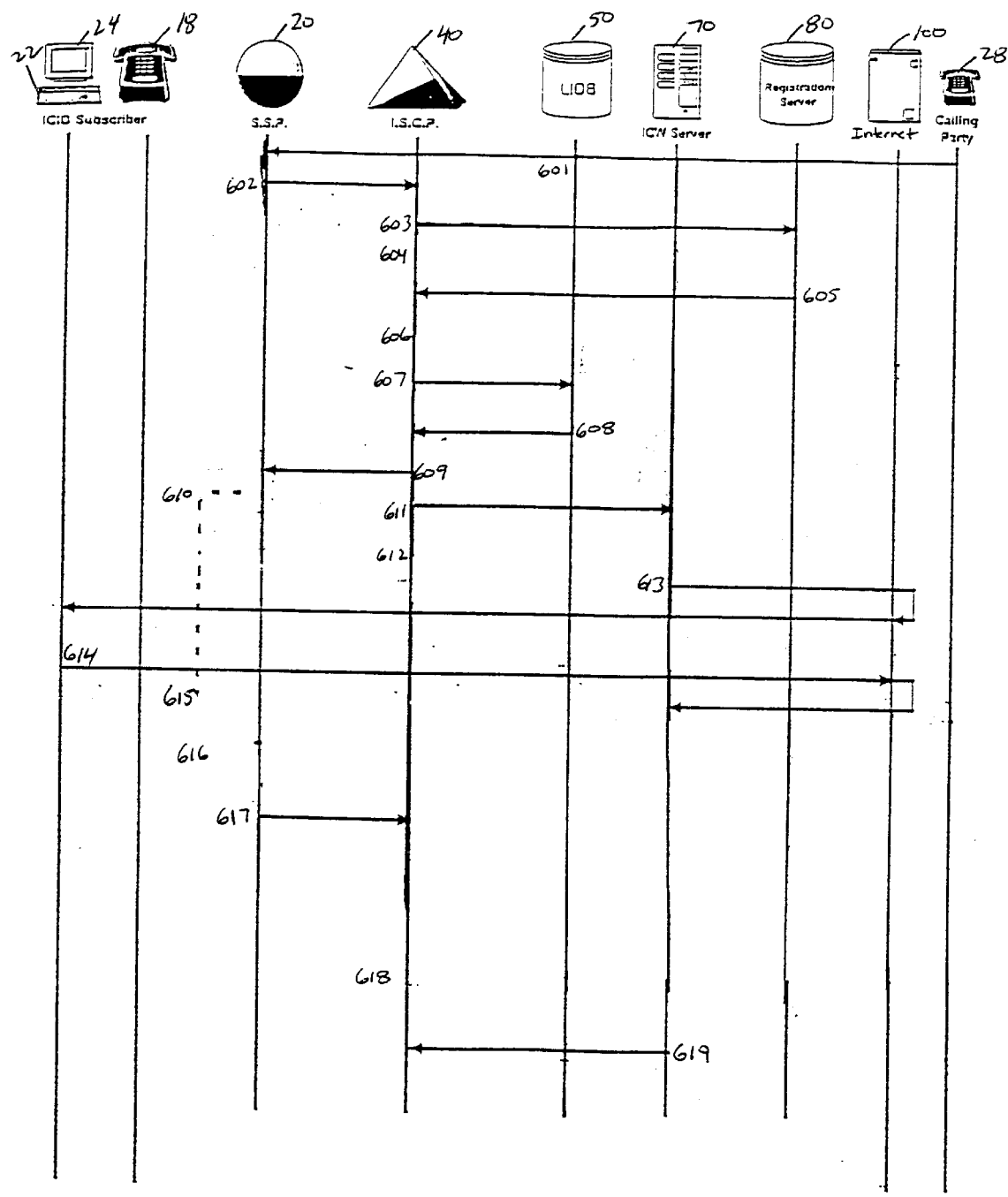
FIG. 8 is an exemplary ICID call flow diagram in which the calling party abandons the telephone call to the ICID subscriber before a response from the ICW server, according to an aspect of the present invention.

FIG. 8 is an ICID call flow diagram in which the caller abandons the telephone call before a response from the ICWS 70. At step 601, a telephone call is placed to an ICID subscriber. A TAT in the terminating CO SSP 20 causes the call to be suspended at the SSP 20. The trigger also causes the SSP 20 to transmit an AIN query message including the CPN (if available) and CDN via the SS7 network and the appropriate STPs 65 to the ICID subscriber's serving ISCP 40 at step 602. At step 603, the ISCP 40 sends a GetData query to the RS 80 with the called party's telephone number to request the online status of the ICID subscriber. At step 604, the ISCP 40 sets a timer equal to a predetermined time, e.g., 2 seconds. In the event that the RS 80 does not respond within the predetermined time (indicating a timeout condition) or responds with an error, the ISCP 40 sends an Authorize Termination response to the SSP 20. As a result, the SSP 20 terminates the suspended telephone call at the subscriber' line and the call may encounter features programmed on the line, e.g., call waiting, call forwarding, etc.

If the subscriber is online with ICID service active, the RS 80 responds with a "1" indicating the subscriber is online. The RS 80 also responds with the IP address, port number, and subscriber key information for the ICID subscriber's Internet session. In this scenario, because the subscriber is online with ICID turned ON, the RS 80 responds to the ISCP 40 at step 605 with a "1". At step 606, a check is performed at the ISCP 40 to determine whether the subscriber has voice mail service.

Also at step 606, a check is performed at the ISCP 40 to determine whether the Presentation Restriction value is restricted or unavailable. If the Presentation Restriction value is restricted and the called party subscribes to Anonymous Call Rejection (ACR) service, an Authorize Termination response is sent to the SSP 20 allowing the call to be rejected.

If the calling party number was delivered with the query and the presentation restriction indicator for the incoming call is allowed, the ISCP 40 launches a query to the Local Number portability database to determine whether the received CPN is ported. The telephone number returned in the response is either equal to the CPN sent in the query if the telephone number is not ported or the LRN if the telephone number is ported. The telephone number from the response is used as the CPN and checked against entries in a table to determine if the NPA-NXX belongs to a participating LEC. If the CPN is found to be a participating LEC, a GetData query is launched to the LIDB 50 at step 607 to retrieve the calling party's name. If the CPN was not delivered with the query, or there is no participating LEC, or the Presentation Restriction indicator for the incoming call is anonymous or unavailable, the ISCP 40 will not launch a GetData query to the LIDB 50 to retrieve the calling party's name. In this event, the calling party name is null in the InvokeApp query to the ICWS 70. If available, the calling party's name is sent to the ISCP 40 from the LIDB 50 at step 608.

At step 609, the ISCP 40 instructs the SSP 20 to play a "please hold" announcement to the calling party to request the calling party to hold the line (step 610). At step 611, the ISCP 40 sends an InvokeApp request to the ICWS 70. The request contains the CDN, CPN (if available and not presentation restricted), the calling party name (if available and not presentation restricted), IP address, port number, client software version, and an indicator as to whether the ICID subscriber has voice mail service.

At step 612, the ISCP sets a timer equal to a predetermined time, e.g., 25 seconds. In the event that the ICWS 70 does not respond within the predetermined time (indicating a timeout condition) or responds with an error, the ISCP 40 instructs the SSP 20 to stop playing the "please hold" announcement to the caller. Then, the SSP 20 begins playing an announcement to the caller informing the caller that the call is being forwarded to a voice mail service. Lastly, the ISCP 40 sends an Authorize Termination response to the SSP 20. If the subscriber does not have voice mail service, an error is reported and the ISCP 40 sends an Authorize Termination response to the SSP 20. As a result, the SSP 20 terminates the suspended telephone call at the subscriber's line and the call encounters any other features programmed on the line, e.g., call waiting, call forwarding, etc.

If no timeout occurs, at step 613, the ICWS 70 sends a message via the Internet 100 to the ICID subscriber which appears on the subscriber's display, informing the subscriber of the incoming call and presenting the subscriber with disposition options for the call. The message displayed may be a pop-up dialog box. At step 614, the ICID subscriber elects a call disposition option to control the call, and as a result, the client software 22 responds to the ICWS 70 with the option. At step 615, the caller abandons the telephone call by hanging up, in which case the SSP 20 stops playing the "please hold" announcement to the caller at step 616 and at step 617, the SSP 20 sends a Resource Clear Message to the ISCP 40 due the abandonment of the telephone call by the caller. At step 618, the ISCP 40 terminates CPR processing, ignoring any responses from the ICWS 70 related to this disconnected call at step 619.

Figure 9:
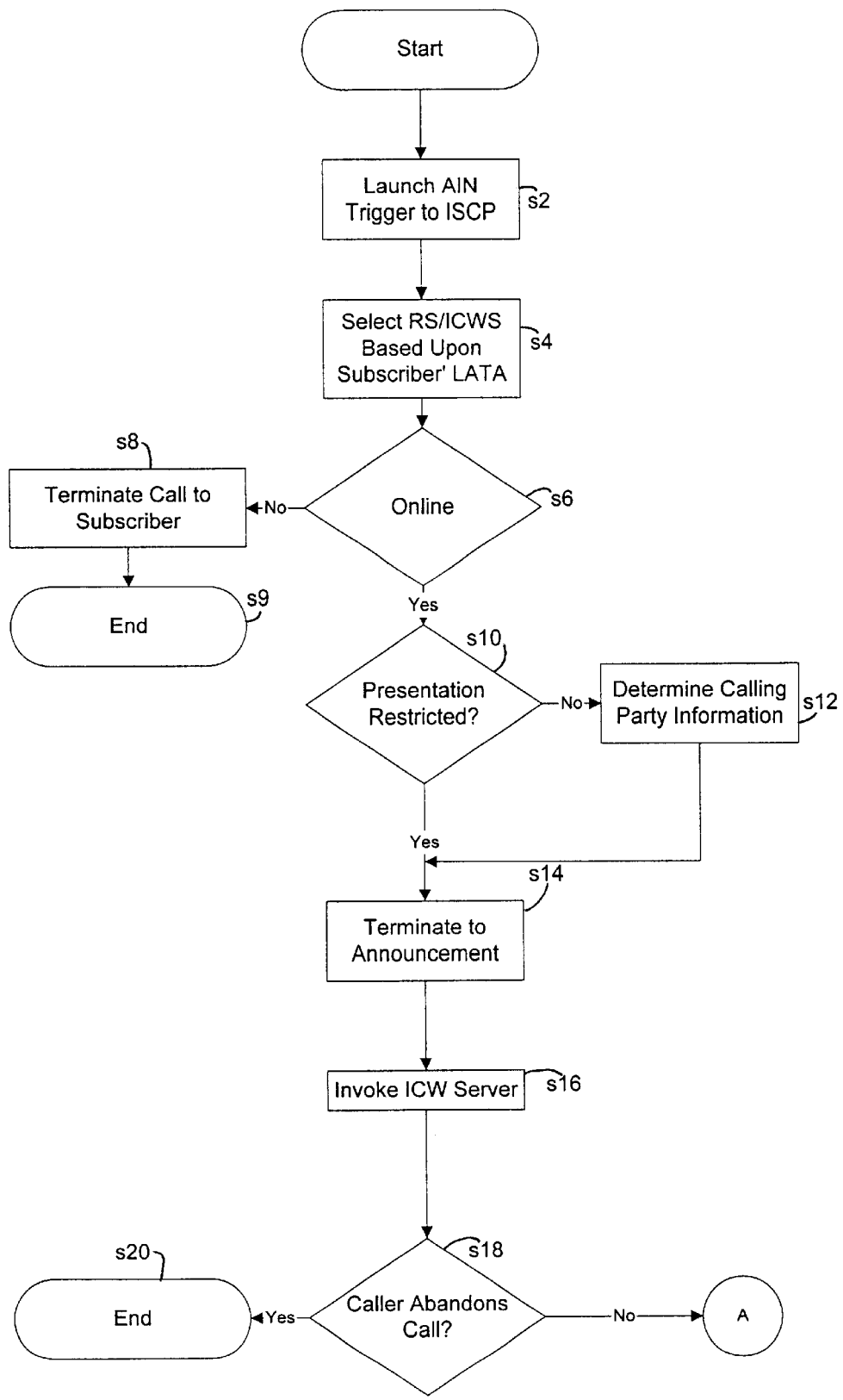
FIG. 9 is an exemplary flowchart diagram of the ICID ISCP Service Logic, according to an aspect of the present invention.
Figure 10:
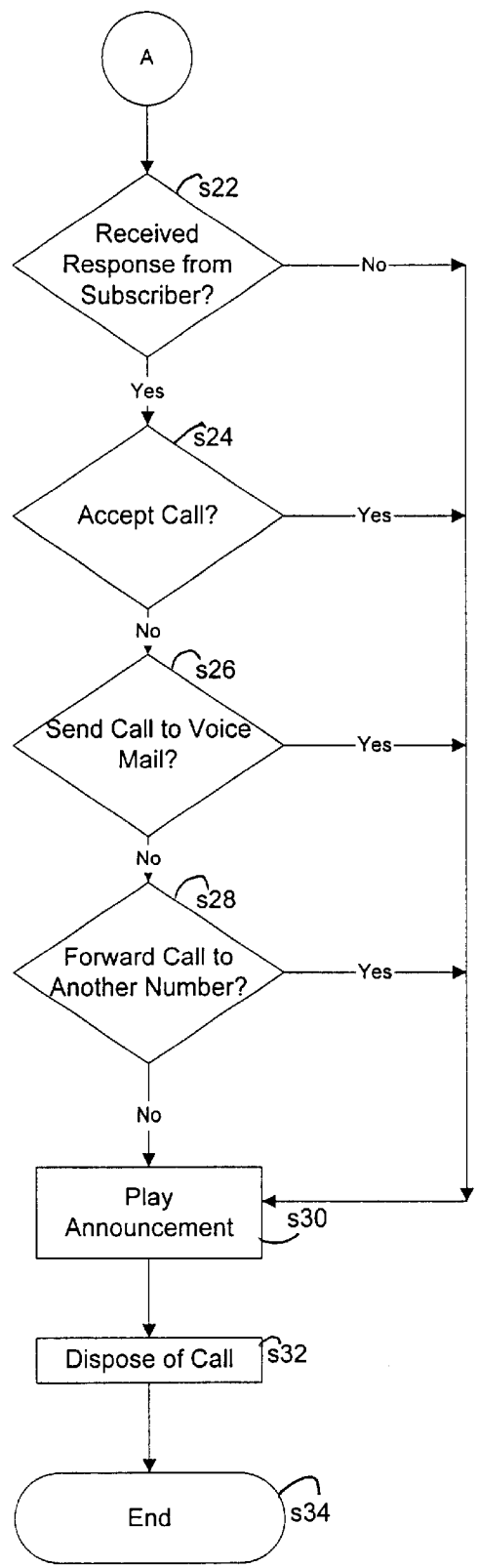
FIG. 10 is a continuation of the exemplary flowchart diagram of FIG. 9.

FIGS. 9 and 10 show an exemplary flowchart diagram of the ICID ISCP Service Logic, according to an aspect of the present invention.

At step s2, a query, including the called party's telephone number, is received by the ISCP 40. At step s4, a table is used to derive the Local Access and Transport Area (LATA) number based upon the NPA-NXX of the called party number. The LATA is used to determine the corresponding RS and ICWS to query for the GetData and InvokeApp requests. That is, the system selects an assigned RS & ICWS from multiple RSs and ICWSs, which each serve a predetermined area. Subsequently, at step s6 the ISCP 40 launches a GetData query to the appropriate RS to obtain the subscriber's online status and sets a timer equal to a predetermined time, e.g., 2 seconds.

If the GetData request is unsuccessful, an error is reported and the ISCP 40 instructs the SSP 20 to terminate the suspended call to the subscriber's line. If however, the GetData request is successful, the subscriber's online status is determined. If the subscriber is not online, the ISCP 40 instructs the SSP 20 to terminate the suspended call to the subscriber's line at step s8 and the logic ends at step s9. If the subscriber is online, a determination is made to ascertain whether the PR value is restricted or unavailable, at step s10.

If the PR indicator for the incoming call is "allowed", the ISCP 40 launches a query to the LNP database to determine whether the received CPN is a ported telephone number. If the query is successful, the telephone number returned in the response is either equal to the CPN sent in the query if the telephone number is not ported, or the LRN if the telephone number is ported. If the query is not successful, an error is reported, the calling party name is set to null, and a determination is made as to whether the subscriber has voice mail service. Next, at step s14 a "please hold" announcement is played to the caller. If the subscriber has voice mail service, the caller is advised that the called party is on another call and that the caller should wait, and that the wait may take fifteen seconds. If the subscriber does not have voice mail service, the caller is advised that the called party is on another call, and that if the caller's call is not taken, the caller may hear a busy signal or be transferred to another number.

If the query is successful, the telephone number from the response is used as the CPN and checked against entries in a table to determine if the NPA-NXX belongs to a participating LEC, in which case a GetData query is launched to the LIDB 50 to retrieve the calling party's name at step s12. If the GetData query is not successful, an error is reported, the calling party name is set to null, and a determination is made as to whether the subscriber has voice mail service. Next, at step s14 a "please hold" announcement is played to the caller. If the subscriber has voice mail service, the caller is advised that the called party is on another call and that the caller should wait, and that the wait may take fifteen seconds. If the subscriber does not have voice mail service, the caller is advised that the called party is on another call, and that if the caller's call is not taken, the caller may hear a busy signal or be transferred to another number.

If the calling party name and number are retrieved at the LIDB 50, a determination is made as to whether the subscriber has voice mail service. Next, at step s14 a "please hold" announcement is played to the caller. An appropriate message is played, depending on whether the subscriber has voice mail service.

If the calling party name is not in the LIDB 50, an error is reported, the calling party name is set to null, and a determination is made as to whether the subscriber has voice mail service. Next, at step s14 a "please hold" announcement is played to the caller. An appropriate message is played, depending on whether the subscriber has voice mail service.

If a call is received with a PR indicator of restricted (anonymous) and the ICID subscriber has the ACR feature activated, an Authorization response is sent to the SSP and the suspended call attempts to terminate at the subscriber's line. If no ACR feature is active, or if the PR value is unavailable, the calling party name is set to null and the CPN is set to anonymous or unavailable. Next, at step s14 a "please hold" announcement is played to the caller. An appropriate message is played, depending on whether the subscriber has voice mail service.

At step s16, the ISCP 40 sends an InvokeApp request to the ICWS 70 containing the CDN, CPN (if available and not presentation restricted), the calling party name (if available and not presentation restricted), IP address, port number, client software version number, and an indicator as to whether the subscriber has voice mail service. If the ICWS 70 does not respond within a predetermined time period, e.g., 25 seconds (indicating a timeout condition), an error is reported and an Authorization Response will be sent to the SSP 20 and the suspended call will attempt to terminate at the subscriber's line. If, however, the ICWS 70 responds within the predetermined time period, a determination is made as to whether the caller has abandoned the call at step s18, in which case the connection is disconnected at step s20. If the caller is still on the line, the ICWS 70 then formats an Internet message to the client software 22 on the ICID subscriber's PC 25, which causes a pop-up box dialog box to be displayed on the subscriber's display 24, informing the subscriber of the incoming call and presenting the subscriber with several call disposition options.

Reference is now made to FIG. 10, which continues the flow of FIG. 9.

A check is made at step s22 to determine whether the subscriber selected a call disposition option and the please hold announcement is terminated. If no call disposition option is made, the call is forwarded to voice mail service, if available. If the subscriber does not have voice mail service, an error is reported, an Authorize Termination response is sent to the SSP 20 and the call will attempt to terminate at the subscriber's line. If the subscriber selects a call disposition option, the caller is advised via an announcement of the call disposition instructions and the call is processed accordingly.

If the subscriber elects to accept the incoming call (step s24), the ISCP 40 instructs the SSP 20 to begin playing a "will take your call" announcement at step s30, after which the ISCP 40 sends an Authorize Termination Response to the SSP 20 which terminates the suspended call to the subscriber's telephone line at step s32.

If the subscriber elects to forward the incoming call to voice mail service (step s26), the ISCP 40 instructs the SSP 20 to begin playing an announcement to the caller that the call is being forwarded to a voice mail service at step s30, after which the ISCP 40 sends an Authorize Termination Response to the SSP 20 at step s32. The call is then connected to the subscriber's voice mail service.

If the subscriber elects to forward the incoming call to another telephone line (step s28), the ISCP 40 instructs the SSP 20 to begin playing a "forwarding to another number" announcement at step s30, after which the ISCP 40 sends a Forward Call response to the SSP 20 at step s32. The call is then forwarded to the desired number.

If the subscriber elects to send the incoming call to an announcement, the ISCP 40 instructs the SSP 20 to begin playing the announcement selected by the subscriber at step s30. The first message that may be played advises the caller that the subscriber is busy and that the caller should call back later. The second option advises the caller that the subscriber is busy and that the subscriber will call the caller back later. After the selected announcement is played to the caller, the logic ends at step s34.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet-switched network transmission (e.g., TCP/IP, UDP/IP, HTML, SHTML, DHTML, XML, PPP, FTP, SMTP, MIME); peripheral control (IrDA; RS232C; USB; ISA; ExCA; PCMCIA), & public telephone networks (ISDN, ATM, xDSL) represent examples of the state of the art. Such standards are periodically superseded by faster or more efficient equivalents having essentially the same functions. Accordingly, replacement standards and protocols having the same functions are considered equivalents.

What is claimed is:

1. A method for allowing a subscriber connected to the Internet via a dial-up connection to receive notification and caller identification information associated with an incoming call from a calling party to the subscriber, the method comprising:

receiving the incoming call at a terminating switch;

suspending the call at the terminating switch;

launching a first query in response to a request from the calling party to establish a connection with the subscriber;

accessing a service control point (SCP) in response to the first query;

launching a second query from the SCP to a Registration Server (RS) to determine the subscriber's Internet status, the subscriber's Internet status comprising whether the subscriber is connected to the Internet;

receiving a response at the SCP from the RS indicating the subscriber's Internet status is active, the response comprising an IP address, port number, and subscriber key information associated with the subscriber's Internet session;

determining identification information associated with the calling party;

playing a first announcement to the calling party;

sending a message from an Internet Call Waiting Server (ICWS), solely via the Internet, to client software on the subscriber's computer, including notification and caller identification information associated with the incoming call;

receiving the subscriber's disposition selection, solely via the Internet, at the ICWS;

playing a second announcement to the calling party; and handling the call according to the subscriber's disposition selection, wherein the subscriber is able to control disposition of calls while being connected to the Internet.

2. The method according to claim 1, wherein the handling further comprises routing the call from the terminating switch to a destination.

3. The method according to claim 1, wherein the identification information comprises a name and a telephone number of the calling party.

4. The method according to claim 1, wherein if the subscriber's disposition selection is to accept the incoming telephone call, the client software sends a de-registration request to the RS and terminates the Internet dial-up connection, and the incoming call is terminated to the subscriber.

5. The method according to claim 1, wherein if the subscriber's disposition selection includes forwarding the call to a voice mail service, the SCP instructs the switch to terminate the incoming telephone call to the subscriber, the call then being forwarded to the voice mail service.

6. The method according to claim 1, wherein if the subscriber's disposition selection includes forwarding the call to another telephone line, the SCP instructs the switch to forward the incoming telephone call to the another telephone line.

7. The method according to claim 1, wherein if the subscriber's disposition selection includes playing a message to the caller, the SCP instructs the switch to play a message to the caller.

8. The method according to claim 7, wherein the message comprises advising the calling party to attempt the call later.

9. The method according to claim 7, wherein the message comprises advising the calling party that the subscriber will return the call.

10. The method according to claim 1, wherein the first announcement advises the calling party to hold the telephone line.

11. The method according to claim 1, wherein the second announcement advises the calling party of the subscriber's selected disposition of the telephone call.

12. A system for allowing a subscriber connected to the Internet via a dial-up connection to receive notification and caller identification information concerning an incoming call from a calling party to the subscriber, the system comprising:

a service control point (SCP) storing processing instructions for the subscriber;

a switch associated with the subscriber that receives the incoming call, the switch having an AIN trigger set to launch a query in response to a request from a calling party to establish a connection with the subscriber, the switch sending the query to the SCP in response to the trigger, receiving routing instructions from the SCP, and playing announcements in response to instructions from the SCP;

a Registration Server (RS) that receives registration requests from client software and stores information related to the subscriber's online status, the RS responding to queries from the SCP with information about the subscriber's online status;

a Heartbeat Server (HS) that updates the RS with the subscriber's online status, receives heartbeat messages from the client software via the Internet, and receives deregistration requests from the client software, the HS comparing information associated with the received heartbeat messages with client registration information in a memory, and sending a message to the RS when there is an interruption of heartbeat messages from the client software; and an Internet Call Waiting Server (ICWS) comprising a communications interface between the SCP and client software, the communications interface receiving information from the SCP and forwarding the information to the subscriber solely via the Internet, the communications interface receiving the subscriber's disposition selection solely from the Internet and forwarding the disposition selection to the SCP, the communications interface forwarding de-registration requests from the client software to the HS.

13. The system according to claim 12, wherein in response to routing instructions received from the SCP, the switch routes the call in accordance with the instructions to its destination.

14. The system according to claim 12, wherein the client software communicates solely via TCP/IP utilizing the Internet with the RS, HS, and ICWS.

15. The system according to claim 14, wherein the HS communicates with the RS solely via TCP/IP utilizing the Internet.

16. The system according to claim 12, further comprising a terminal device storing the client software of the subscriber, the client software alerting the subscriber to the incoming call, sending registration and de-registration requests, and sending the subscriber's disposition selection to the ICWS.

17. The system according to claim 12, wherein when the subscriber's disposition selection comprises accepting the call, the client software sends a de-registration request to the RS and terminates the Internet dial-up connection, the incoming call then being terminated to the subscriber.

18. The system according to claim 12, wherein when the subscriber's disposition selection comprises forwarding the call to voice mail, the SCP instructs the switch to terminate the incoming telephone call to the subscriber, the incoming call then being forwarded to the voice mail service.

19. The system according to claim 12, wherein when the subscriber's disposition selection comprises forwarding the call to another number, the SCP instructs the switch to forward the incoming telephone call to another telephone line.

20. The system according to claim 12, wherein when the subscriber's disposition selection comprises playing a message to the caller, the SCP instructs the switch to play a message to the caller.

21. The system according to claim 20, in which the message advises the calling party to attempt the call later.

22. The system according to claim 20, in which the message advises the calling party that the subscriber will return the call.

* * * * *